(12) United States Patent
Hashimoto et al.

(10) Patent No.: US 7,991,487 B2
(45) Date of Patent: Aug. 2, 2011

(54) METHOD, COMPUTER, AND RECORDING MEDIUM STORING A PROGRAM FOR COMPUTING ENGINE DESIGN VARIABLES

(75) Inventors: Yoshihiro Hashimoto, Yokohama (JP);
Yuichiro Sampei, Yokohama (JP);
Tomoyuki Hiroyasu, Kyotanabe (JP)

(73) Assignees: Ono Sokki Co., Ltd., Kanagawa (JP);
The Doshisha, Kyoto (JP)

( * ) Notice: Subject to any disclaimer, the term of this patent is extended or adjusted under 35 U.S.C. 154(b) by 332 days.

(21) Appl. No.: 12/380,246

(22) Filed: Feb. 25, 2009

(65) Prior Publication Data

US 2009/0222245 A1 Sep. 3, 2009

(30) Foreign Application Priority Data

Feb. 29, 2008 (JP) ................... 2008-050108

(51) Int. Cl.
*G05B 13/02* (2006.01)
*G06F 11/30* (2006.01)
*G06C 17/00* (2006.01)
*G06F 7/60* (2006.01)
*G06F 17/10* (2006.01)

(52) U.S. Cl. ............... 700/28; 700/30; 700/31; 700/46; 700/73; 700/74; 702/183; 703/2; 703/7; 706/13

(58) Field of Classification Search .............. 700/28–31, 700/46, 73–74, 97, 182; 706/13; 702/183; 703/2, 7
See application file for complete search history.

(56) References Cited

U.S. PATENT DOCUMENTS

| 5,146,324 | A | * | 9/1992 | Miller et al. ............. 375/240.03 |
| 5,677,857 | A | * | 10/1997 | Hayashi et al. ................. 703/8 |
| 6,132,108 | A | * | 10/2000 | Kashiwamura et al. ......... 703/2 |
| 6,411,945 | B1 | * | 6/2002 | Nakajima ..................... 706/19 |
| 2005/0082706 | A1 | * | 4/2005 | Nagaoka et al. ............. 264/40.1 |
| 2006/0161391 | A1 | * | 7/2006 | Inaba et al. .................. 702/183 |

(Continued)

FOREIGN PATENT DOCUMENTS

EP 1548608 6/2005

(Continued)

OTHER PUBLICATIONS

De Risi et al, "An Innovative methodology to improve the design and the performance of direct injection diesel engines," International Journal of Engine Research 2004, Professional Engineering Publishing GB, vol. 5, No. 5, 2004, pp. 425-441.

(Continued)

*Primary Examiner* — Ramesh B Patel
(74) *Attorney, Agent, or Firm* — Dilworth & Barrese, LLP.

(57) ABSTRACT

For a plurality of combinations of a plurality of operating states included in an operating range of an engine and for a plurality of combinations of a plurality of objective variables, a system, which calculates design variables, includes a calculating device for obtaining global optimal solutions of the design variables that minimize or maximize a sum of the plurality of objective variables, which respectively correspond to the plurality of combinations of the plurality of operating states; a receiving device for receiving designation of an upper limit or a lower limit of the plurality of objective variables; and a searching device for searching for global optimal solutions that result in the smoothest change in the design variables when changing the operating states in a range of the received upper limit to the received lower limit of the objective variables, with one of the global optimal solutions as an initial value set.

11 Claims, 32 Drawing Sheets

U.S. PATENT DOCUMENTS

2006/0233637 A1* 10/2006 Yakushi et al. .................. 415/13
2009/0210366 A1* 8/2009 Sakata et al. .................... 706/13

FOREIGN PATENT DOCUMENTS

JP  11-353298  12/1999

OTHER PUBLICATIONS

Drake et al, "Advanced gasoline engine development using optical diagnostics and numerical modeling," Proceedings of the Combustion Institute, Elsevier, NL, vol. 31, No. 1, Dec. 28, 2006, pp. 99-124.

De Risi et al, "Optimization of the Combustion Chamber of Direct Injection Diesel Engines," Society of Automotive Engineers Publications, No. 2003-01-1064, Jan. 1, 2003, pp. 1-9.

Atashkari et al, "Thermodynamic Pareto optimization of turboject engines using multi-objective genetic algorithms," International Journal of Thermal Sciences, Editions Elsevier, Paris FR, vol. 44, No. 11, Nov. 1, 2005, pp. 1061-1071.

* cited by examiner

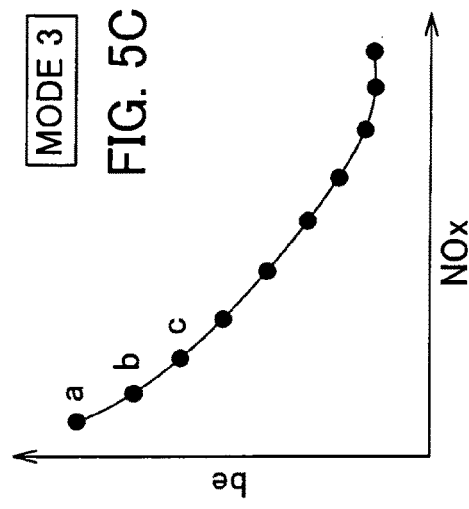
FIG. 5A MODE 1
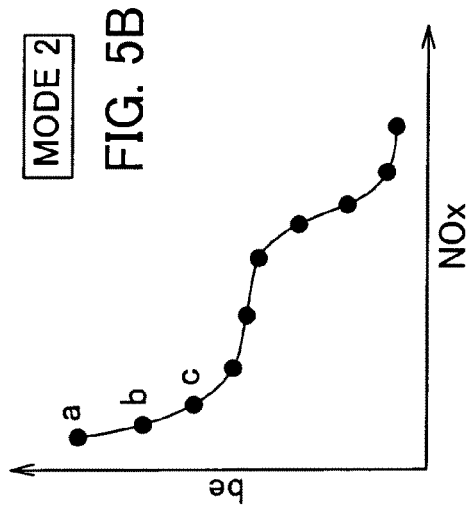
FIG. 5B MODE 2
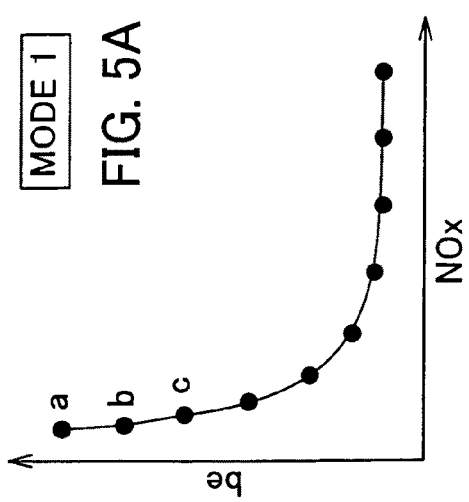
FIG. 5C MODE 3
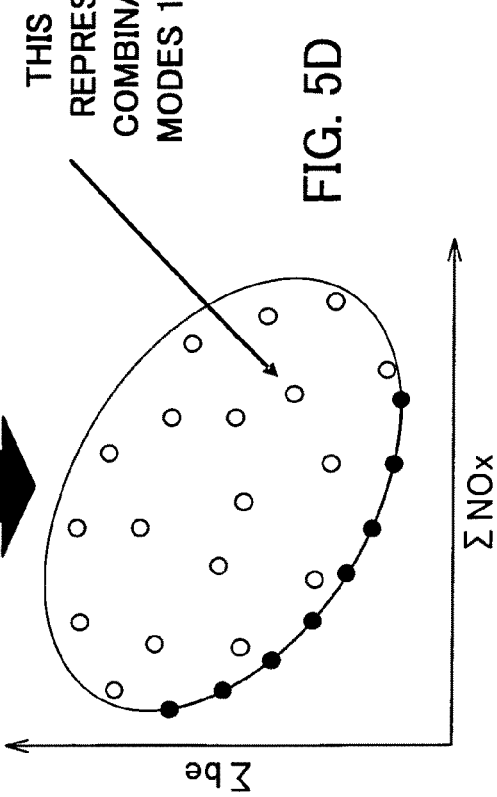
FIG. 5D

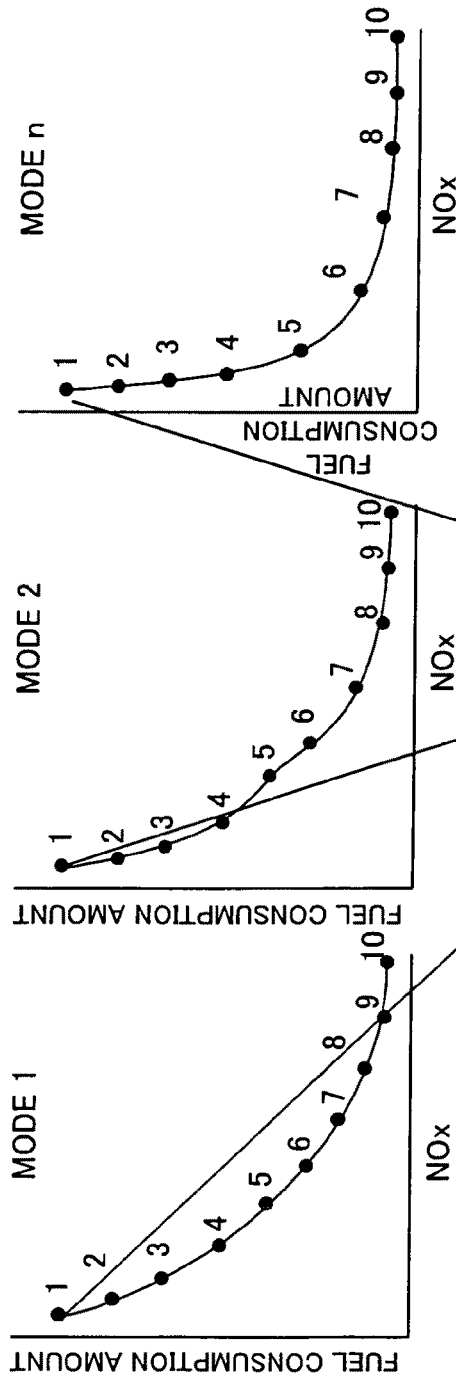
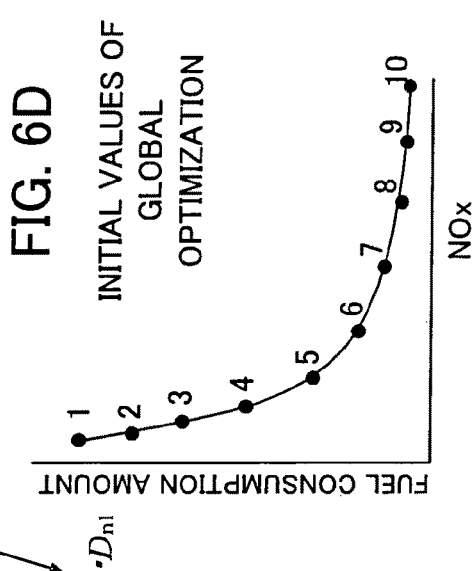

FIG. 6A MODE 1
FIG. 6B MODE 2
FIG. 6C MODE n
FIG. 6D INITIAL VALUES OF GLOBAL OPTIMIZATION $W_1 \cdot D_{11} + W_2 \cdot D_{21} + W_n \cdot D_{n1}$ FOR EXAMPLE, SUFFIXES ARE APPENDED TO PARETO SOLUTIONS IN MODES 1 THROUGH n. THE VALUE OBTAINED BY SUMMATING THE PARETO SOLUTIONS WITH THE SAME SUFFIXES IS USED AS THE INITIAL VALUE.

DMODE NUMBER · DATA NUMBER: PARETO SOLUTION
WMODE NUMBER: WEIGHTING FACTOR IN EACH MODE

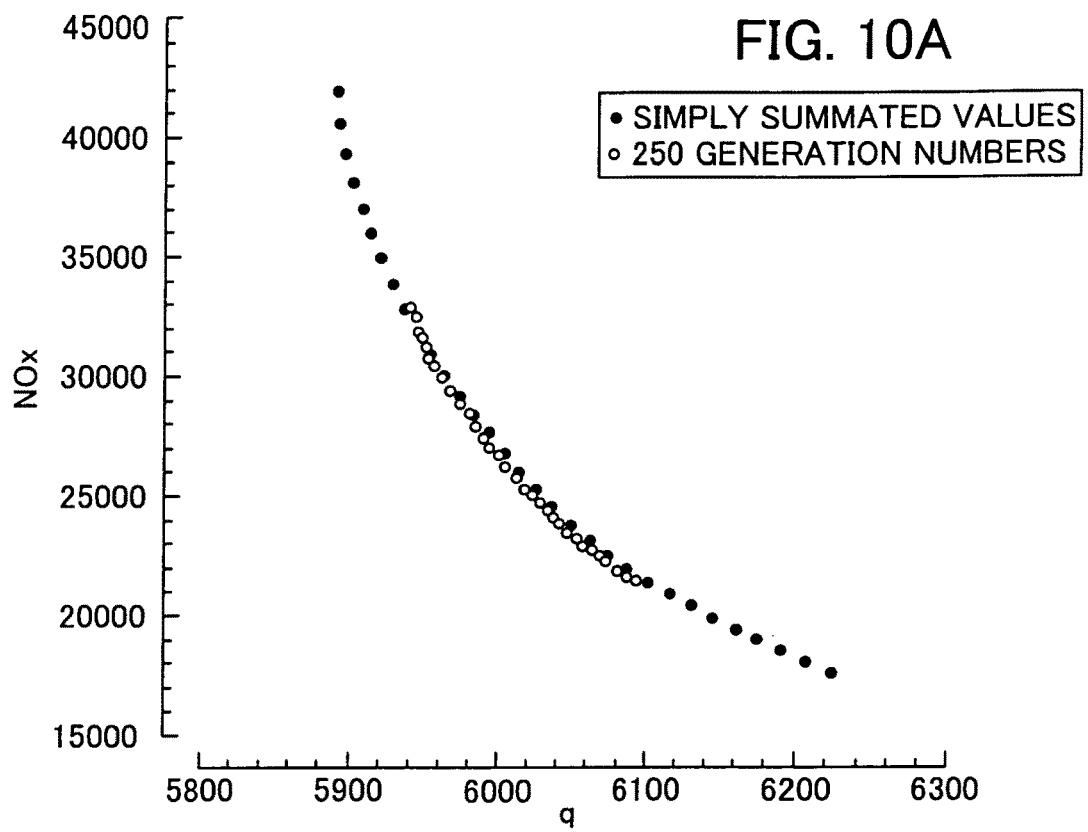
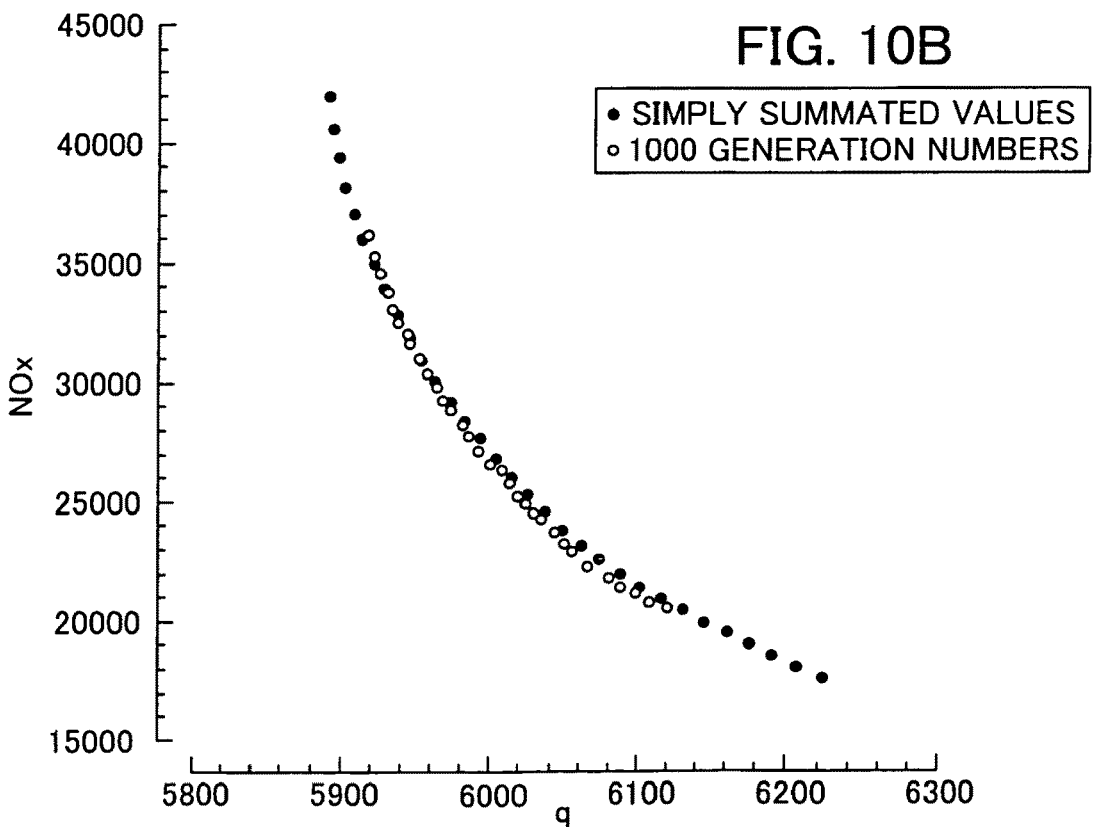

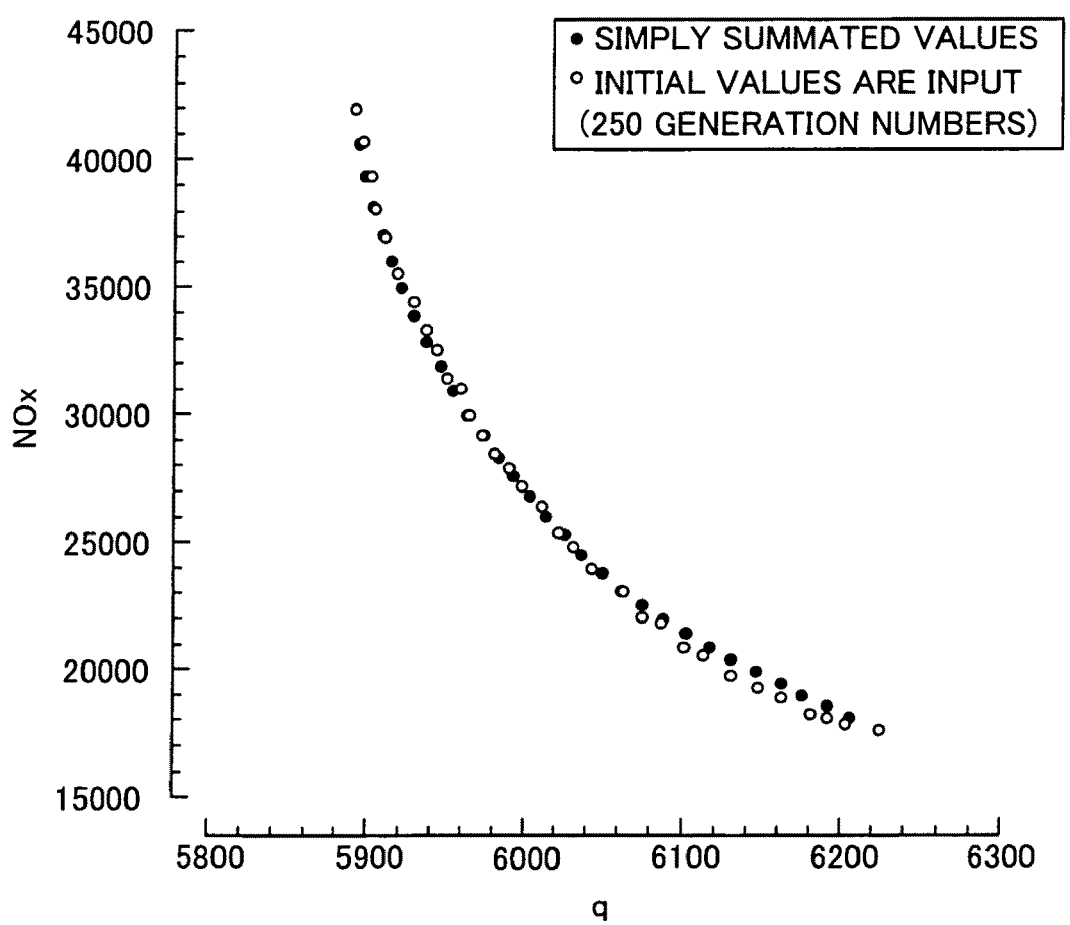

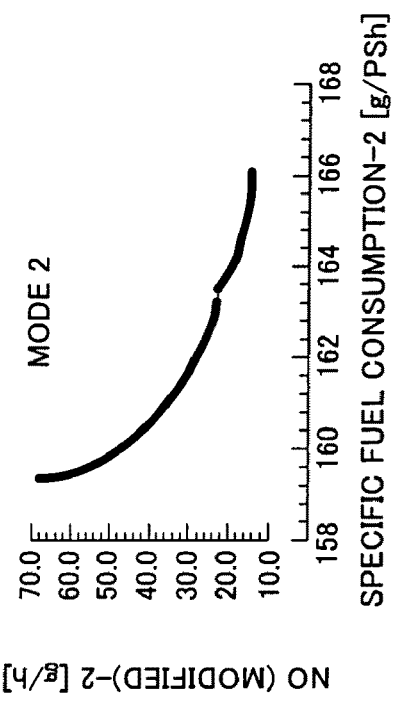
FIG. 14A MODE 1
FIG. 14B MODE 2
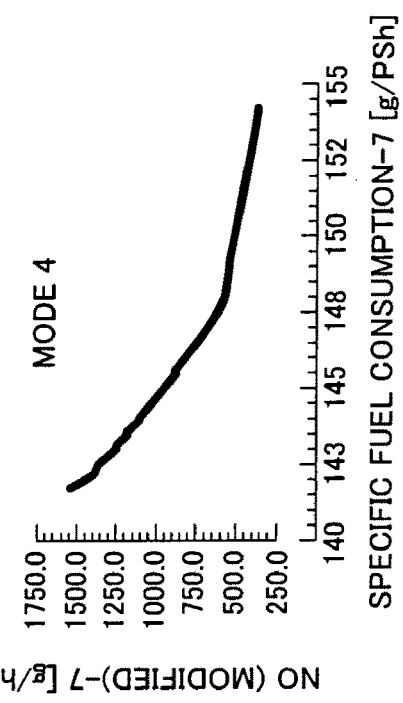
FIG. 14C MODE 3
FIG. 14D MODE 4
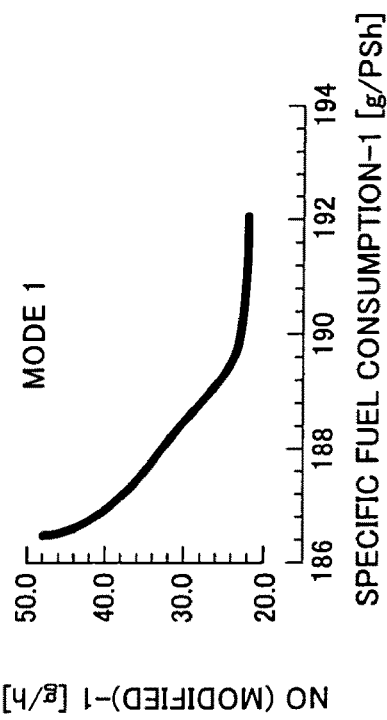
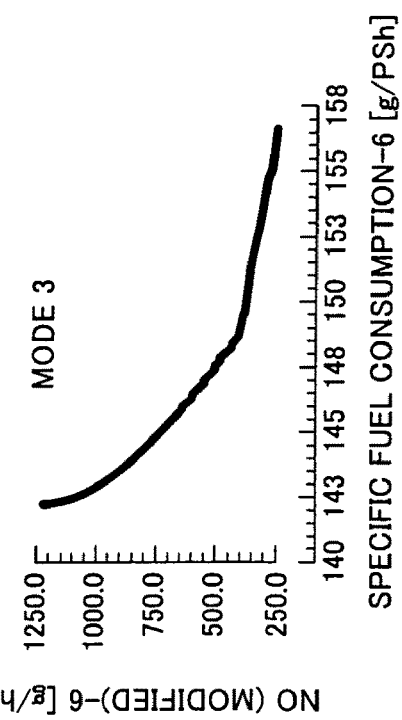

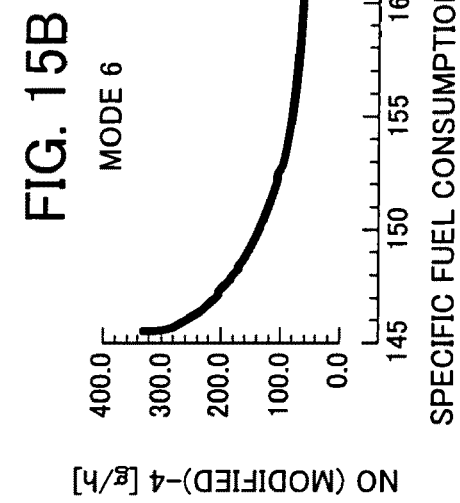
FIG. 15A MODE 5
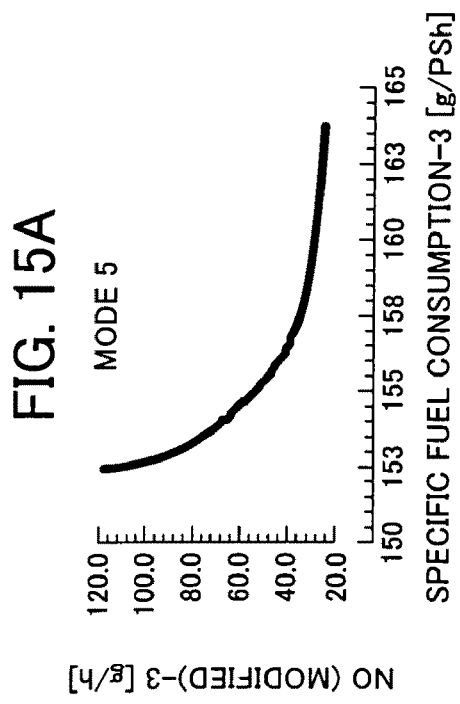
FIG. 15B MODE 6
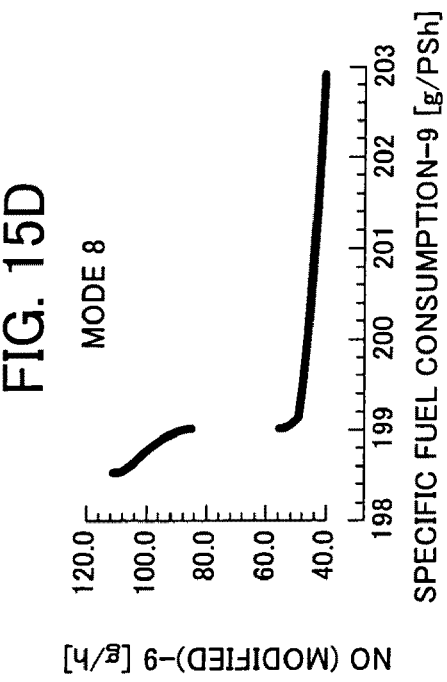
FIG. 15C MODE 7
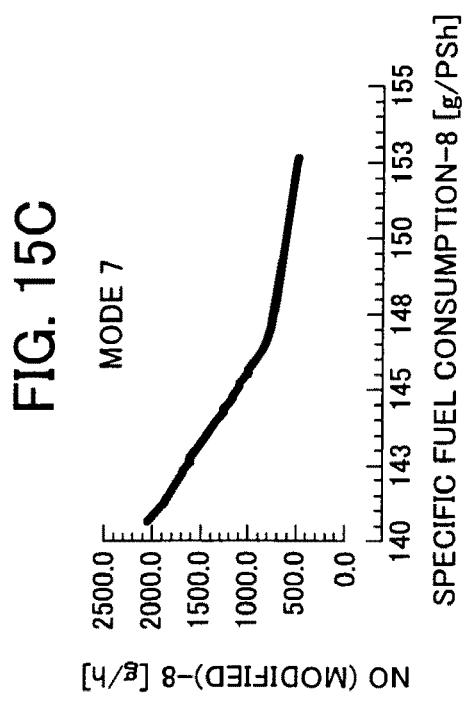
FIG. 15D MODE 8

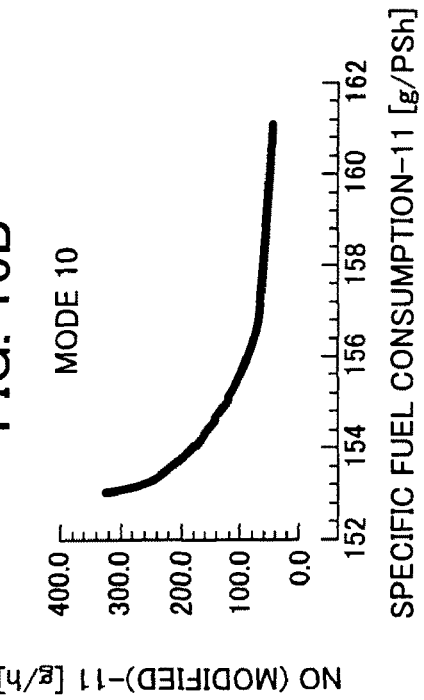
FIG. 16A MODE 9
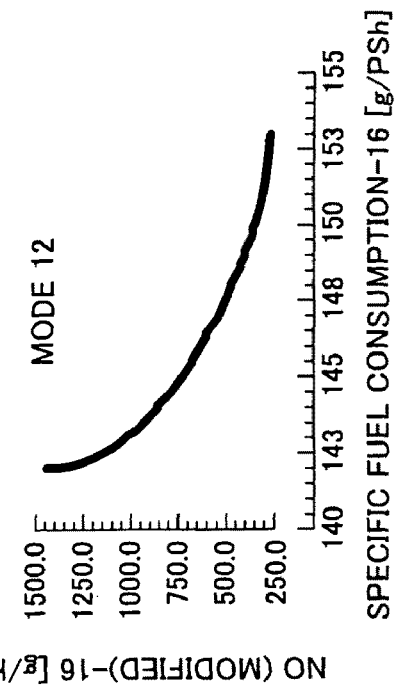
FIG. 16B MODE 10
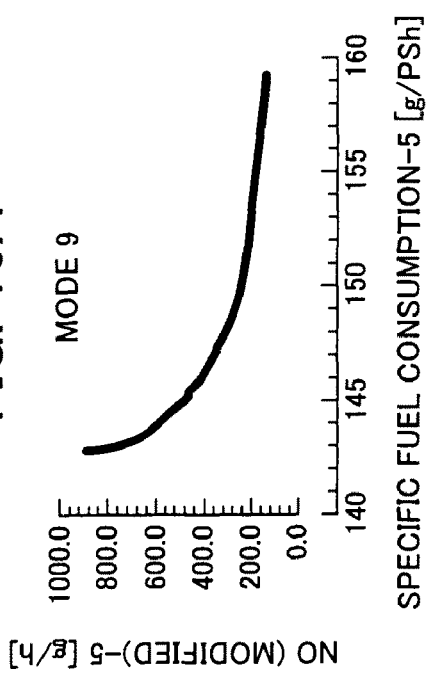
FIG. 16C MODE 11
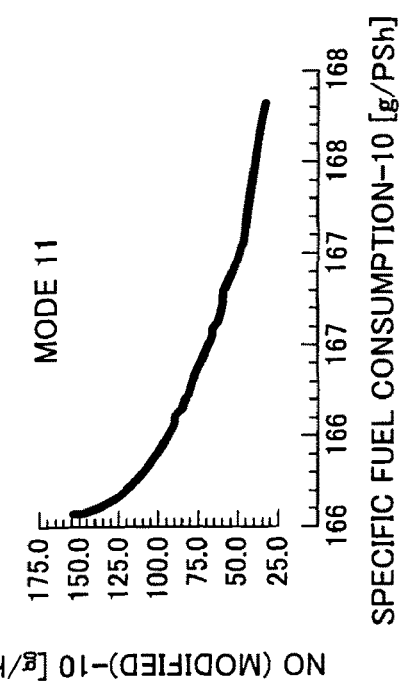
FIG. 16D MODE 12

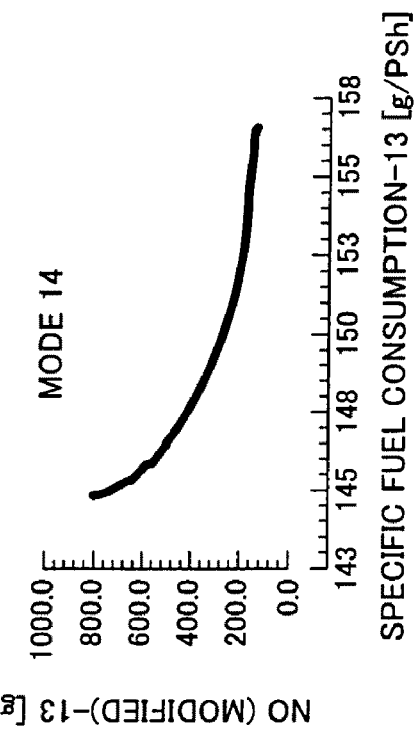
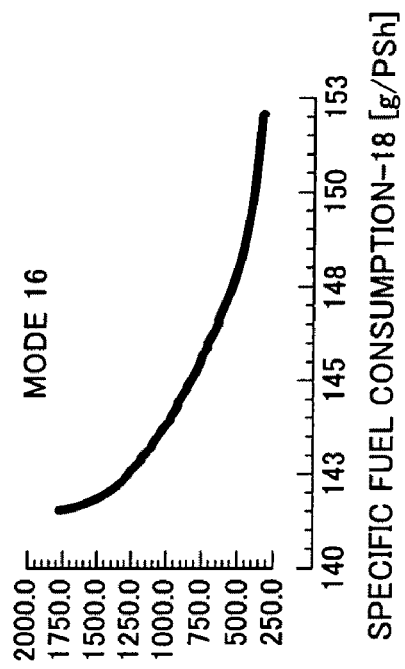
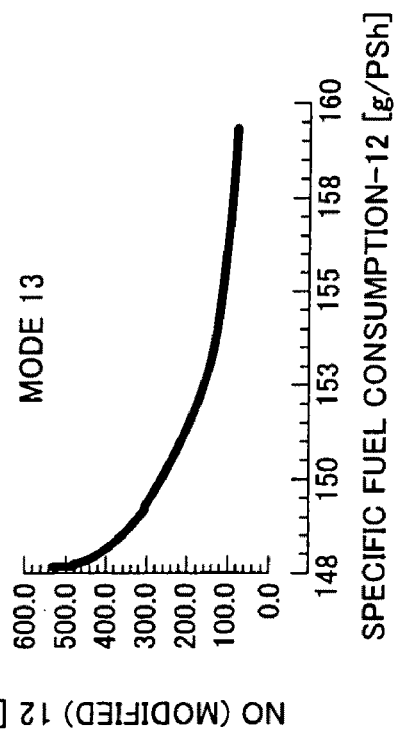
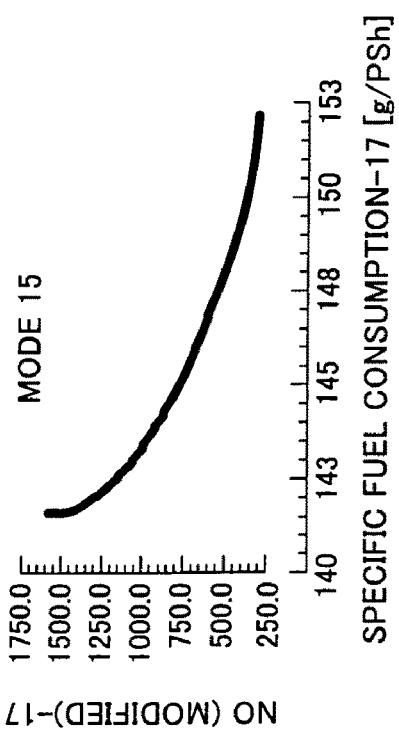

MODE 22

MODE 23

MODE 24

MODE 25

METHOD, COMPUTER, AND RECORDING MEDIUM STORING A PROGRAM FOR COMPUTING ENGINE DESIGN VARIABLES

This application is based on and claims the benefit of priority from Japanese Patent Application No. 2008-050108, filed on 29 Feb. 2008, the content of which is incorporated herein by reference.

BACKGROUND OF THE INVENTION

1. Field of the Invention

The present invention relates to a method, a computer, and a program for calculating engine design variables. More specifically, it relates to a method, a computer, and a program for optimizing a degree of change (smoothness) of design variables in relation to the change of operating states when calculating global optimal solutions of the design variables (e.g., EGR valve position, fuel injection timing, ignition timing, and the like) which minimize or maximize a combination of multiple objective variables (e.g., specific fuel consumption, nitrogen oxides emission concentration) for multiple combinations (modes) of multiple operating states (e.g., engine revolutions, loads, and the like) included in an operating range of the engine.

2. Related Art

Conventionally, various methods have been proposed for calculating engine design variables.

For example, a computer expresses a certain objective variable in quadratic polynomials of multiple design variables, and calculates using a genetic algorithm or other calculating methods for each of multiple combinations of multiple operating states. Thereby, it is possible to obtain local optimal solutions of design variables which minimize or maximize the multiple combinations of the objective variables.

Such local optimal solutions may not be combined as is for the purpose of calculating the global optimal solutions of design variables which minimize or maximize the multiple combinations of the objective variables in the entire operating range.

On the other hand, according to Japanese Unexamined Patent Application Publication No. Hei 11-353298, a method of calculating a comprehensive evaluated value by calculating a local preliminary evaluated value for each segmented evaluation area, and evaluating the values comprehensively, has been proposed for evaluating an engine and the like using a genetic algorithm online.

However, a method of optimizing a degree of change (smoothness) of design variables in relation to the change of operating states when calculating global optimal solutions of the design variables has not been disclosed in any way in Japanese Unexamined Patent Application Publication No. Hei 11-353298. More specifically, in the case of a design in which the design variables abruptly change in relation to a change in engine revolution speed and load, even the global optimal solutions are not preferable for the engine design, and therefore there is a need for obtaining global optimal solutions in which the degree of change is not abrupt but smooth.

SUMMARY OF THE INVENTION

An object of the present invention is to provide a method, a computer, and a recording medium on which a program is recorded, for optimizing the degree of change (smoothness) of the design variables in relation to the operating states when calculating global optimal solutions.

More specifically, the present invention provides the following.

According to a first aspect of the present invention, a method is provided for calculating, by use of a computer, design variables (e.g., valve position of EGR, fuel injection timing, ignition timing, and the like) for a plurality of combinations (e.g., modes) of a plurality of operating states (e.g., engine revolution speed, loads, and the like) included in an operating range of an engine and for a plurality of combinations of a plurality of objective variables (e.g., specific fuel consumption, nitrogen oxides emission concentration, and the like), the method including:

a step of obtaining global optimal solutions of the design variables that minimize or maximize a sum of the plurality of objective variables which respectively correspond to the plurality of combinations of the plurality of operating states;

a step of receiving designation of an upper limit or a lower limit of the plurality of objective variables; and a step of searching for global optimal solutions which result in the smoothest change in the design variables when changing the operating states in a range of the received upper limit to the received lower limit of the objective variables, with one of the global optimal solutions as an initial value set.

With such a configuration of the present invention, the computer obtains global optimal solutions of the design variables which minimize or maximize a sum of the plurality of objective variables, which respectively correspond to the plurality of combinations of the plurality of operating states, receives designation of an upper limit or a lower limit of the plurality of objective variables, and searches for global optimal solutions that result in the smoothest change in the design variables (i.e. results in a fewer frequency of multimodal changes in the operating states) when changing the operating states in a range of the received upper limit to the received lower limit of the objective variables, with one of the global optimal solutions as an initial value set.

This makes it possible for the computer to search for global optimal solutions that result in the smoothest change in the design variables when changing the operating states under the constriction of the upper limit or the lower limit of the plurality of the objective variables, with one of the global optimal solutions as an initial value set.

As a result, the computer can search for the global optimal solutions within the constricted range of the plurality of objective variables based on the initial value set.

Accordingly, the present invention makes it possible to search for global optimal solutions that result in the smoothest change in the design variables when changing the operating states, while reducing a load on the computer that calculates the design variables.

It should be noted that the computer may obtain the global optimal solutions by receiving an input from a user. Alternatively, the computer may obtain the global optimal solutions by receiving them from another computer connected via a communication network. Alternatively, the computer may obtain the global optimal solutions through calculation. In this way, although the present invention is not limited to the method of obtaining the global optimal solutions, the present invention presumes that global optimal solutions are obtained as a set of combinations of the plurality of design variables which minimize or maximize a sum of the plurality of objective variables for the plurality of combinations of the plurality of operating states and for the plurality of combinations of the plurality of objective variables.

In addition, the computer may similarly obtain the initial value set by receiving a designation input from a user. Alternatively, the computer may arbitrarily extract the initial value set from the global optimal solutions in a range where the objective variables do not exceed the upper limit or the lower limit.

According to a second aspect of the present invention, with the method described in the first aspect, in the step of searching, the computer searches for the global optimal solutions such that a square-sum of a remainder of fitting to a curve surface function is minimized regarding changes in the design variables in relation to the operating states.

With such a configuration of the present invention, the computer searches for the global optimal solutions such that a square-sum of a remainder of fitting to a curve surface function is minimized regarding changes in the design variables in relation to the operating states.

This makes it possible for the computer to search for the global optimal solutions such that a square-sum of a remainder of fitting to a curve surface function is minimized, and to search for the global optimal solutions that result in the smoothest change in the design variables when changing the operating states.

According to a third aspect of the present invention, with the method described in the first aspect, in the step of searching, the computer searches for the global optimal solutions such that a square-sum of a remainder of fitting to a quadratic surface is minimized, regarding changes in the design variables in relation to the operating states.

With such a configuration of the present invention, the computer searches for the global optimal solutions such that a square-sum of a remainder of fitting to a quadratic surface is minimized regarding changes in the design variables in relation to the operating states.

This makes it possible for the computer to search for the design variables such that a square-sum of a remainder of fitting to a quadratic surface is minimized, and to search for global optimal solutions that result in the smoothest change in the design variables when changing the operating states.

According to a fourth aspect of the present invention, the method described in any of the first to third aspects further includes:

a step of displaying, by the computer, changes in the design variables (as a graph, for example) in relation to the operating states, regarding the searched global optimal solutions.

With such a configuration of the present invention, the computer displays changes in the design variables (as a graph, for example) in relation to the operating states, regarding the searched global optimal solutions.

As a result, the user can easily visually confirm the changes in the design variables displayed as a graph and the like in relation to the operating states, regarding the searched global optimal solutions.

In this case, it is preferable that the graph and the like display a change of one design variable selected from the plurality of design variables in relation to any two operating states selected from the operating states, by means of a two-dimensional curve surface.

According to a fifth aspect of the present invention, the method described in any of the first to fourth aspects further includes:

a step of displaying, by the computer, the global optimal solutions as a graph of changes in the design variables in relation to changes in the operating states; and a step of receiving an operation for designating an upper limit or a lower limit of the objective variables, while presenting the displayed graph.

With such a configuration of the present invention, the computer can display the global optimal solutions as a graph of changes in the design variables in relation to the operating states, while receiving an operation for designating an upper limit or a lower limit of the objective variables from the user.

As a result, the user can perform an operation for designating an upper limit or a lower limit of the objective variables, while viewing the global optimal solutions displayed as the graph.

According to a sixth aspect of the present invention, in the method of any of the first to fifth aspects, the method utilizes a program that allows execution of processing in each of the steps is used.

According to a seventh aspect of the present invention, in the method described in any of the first to sixth aspects, the operating states include at least the engine revolution speed and the engine load.

With such a configuration of the present invention, the computer can search for the global optimal solutions for the operating states that include at least the engine revolution speed and engine load.

According to an eighth aspect of the present invention, in the method described in any of the first to seventh aspects, the objective variables include at least specific fuel consumption of the engine and nitrogen oxides emission concentration.

With such a configuration of the present invention, the computer can calculate the global optimal solutions of the design variables for at least specific fuel consumption and nitrogen, which are representative objective variables.

According to a ninth aspect of the present invention, in a computer for calculating design variables (e.g., EGR valve position, fuel injection timing, ignition timing, and the like) for a plurality of combinations (e.g., modes) of a plurality of operating states (e.g., engine revolution speed, loads, and the like) included in an operating range of an engine and for a plurality of combinations of a plurality of objective variables (e.g., specific fuel consumption, nitrogen oxides emission concentration, and the like), the computer includes:

a calculating device for obtaining global optimal solutions of the design variables that minimize or maximize a sum of the plurality of objective variables, which respectively correspond to the plurality of combinations of the plurality of operating states;

a receiving device for receiving designation of an upper limit or a lower limit of the plurality of objective variables; and a searching device for searching for global optimal solutions which result in the smoothest change in the design variables when changing the operating states in a range of the received upper limit to the received lower limit of the objective variables, with one of the global optimal solutions as an initial value set.

By utilizing the computer described in the ninth aspect, it is possible to anticipate the same operation and effect as the contents described in the first aspect.

According to a tenth aspect of the present invention, a recording medium stores a program for causing a computer to calculate design variables (e.g., EGR valve position, fuel injection timing, ignition timing, and the like) for a plurality of combinations (e.g., modes) of a plurality of operating states (e.g., engine revolution speed, loads, and the like) included in an operating range of an engine and for a plurality of combinations of a plurality of objective variables (e.g., specific fuel consumption, nitrogen oxides emission concentration, and the like), in which the recording medium storing the program for causing the computer performs:

a step of obtaining global optimal solutions of the design variables which minimize or maximize a sum of the plurality of objective variables which respectively correspond to the plurality of combinations of the plurality of operating states;

a step of receiving designation of an upper limit or a lower limit of the plurality of objective variables; and a step of searching for global optimal solutions that result in the smoothest change in the design variables when changing the operating states in a range of the received upper limit to the received lower limit of the objective variables, with one of the global optimal solutions as an initial value set.

By installing in the computer and utilizing the program described in the tenth aspect, it is possible to anticipate the same operation and effect as the contents described in the first aspect.

According to the present invention, the computer is able to search for global optimal solutions that result in the smoothest change in the design variables when changing the operating states under the constriction of the upper limit or the lower limit of the plurality of the objective variables, with one of the global optimal solutions as an initial value set. As a result, the computer can search for the global optimal solutions within the constricted range of the plurality of objective variables based on the initial value set.

BRIEF DESCRIPTION OF THE DRAWINGS

FIGS. 5A to 5D are diagrams illustrating a concept of global optimal solution calculation processing according to one example of the preferred embodiment of the present invention;

FIGS. 6A to 6D are diagrams illustrating a concept of initial value calculation processing according to one example of the preferred embodiment of the present invention;

FIGS. 10A and 10B are diagrams respectively showing exemplary output (display) results of conventional global optimal solution calculation processing;

FIG. 12 is a diagram showing an exemplary output (display) result of global optimal solution calculation processing according to one example of the preferred embodiment of the present invention;

FIGS. 14A to 14D are diagrams respectively showing exemplary local solutions (Pareto solutions) of minimizing objective variables according to one example of the preferred embodiment of the present invention;

FIGS. 15A to 15D are diagrams respectively showing exemplary local solutions (Pareto solutions) of minimizing objective variables according to one example of the preferred embodiment of the present invention;

FIGS. 16A to 16D are diagrams respectively showing exemplary local solutions (Pareto solutions) of minimizing objective variables according to one example of the preferred embodiment of the present invention;

FIGS. 17A to 17D are diagrams respectively showing exemplary local solutions (Pareto solutions) of minimizing objective variables according to one example of the preferred embodiment of the present invention;

DETAILED DESCRIPTION OF THE INVENTION

Figure 1:
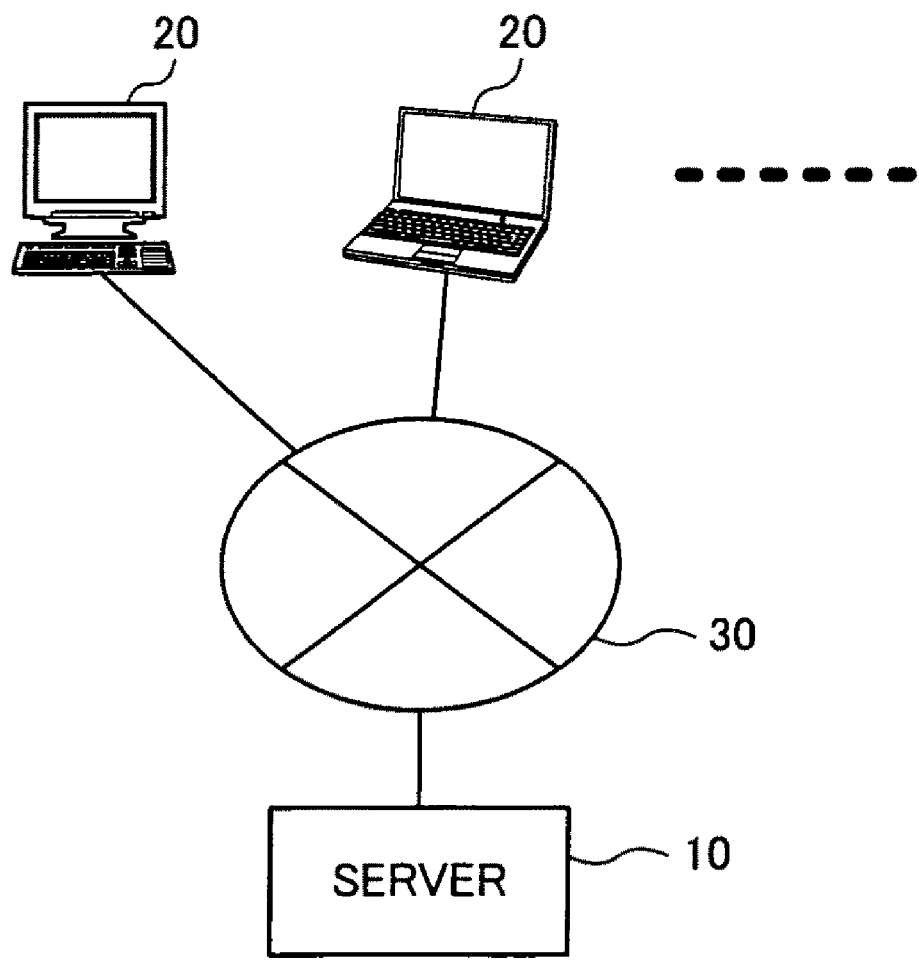
FIG. 1 shows an entire structure of a system 1 according to one example of a preferred embodiment of the present invention.

An embodiment of the present invention is described below while referring to the drawings.

[Entire System Structure]

FIG. 1 shows an entire structure of a system 1 according to one example of a preferred embodiment of the present invention.

A server 10 is connectable to terminals 20 via a communication network 30. A computer according to one example of a preferred embodiment of the present invention may be provided as the system 1, which is configured with the server 10 and the terminals 20. Alternatively, it may be provided as a stand-alone computer (e.g., only the terminal 20).

In addition, the communication network 30 which connects the terminals 20 and the server 10 may be provided, not just as one implementing wired communication, but as one of various types of communication networks which correspond to the technical idea of the present invention, such as one implementing wireless communication via a base station such as a cellular phone and the like, or one implementing communication with wireless LAN via an access point and the like.

[Hardware Structure of Server 10]

Figure 2:
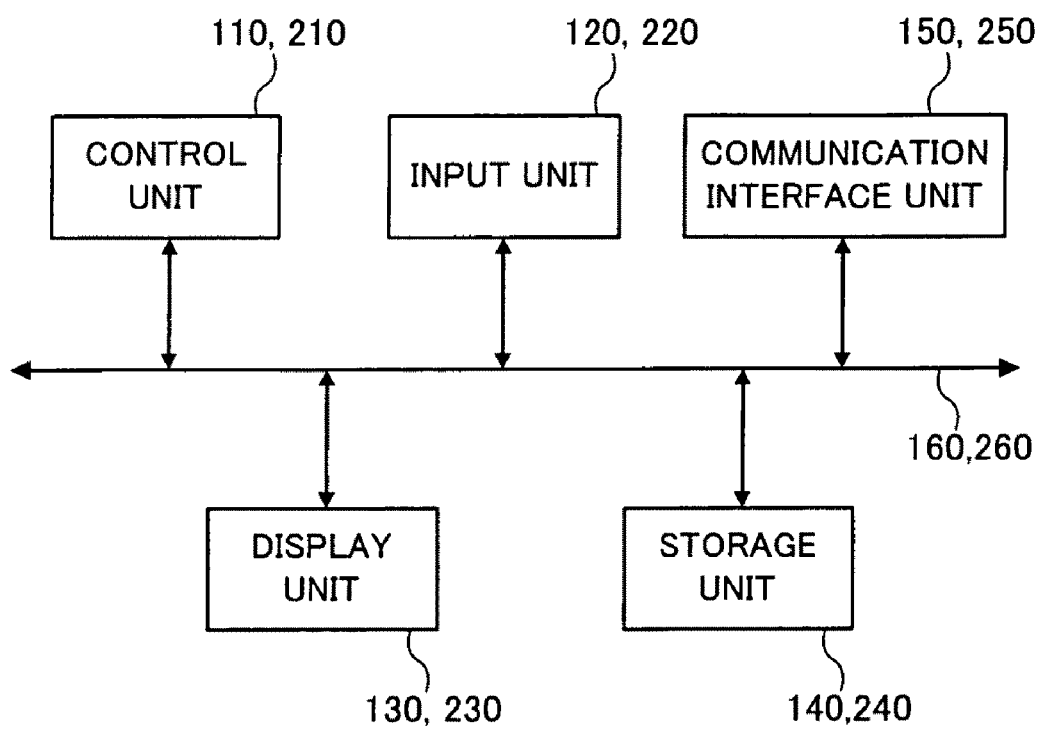
FIG. 2 shows a structure of a server 10 and terminals 20 according to one example of the preferred embodiment of the present invention.

As illustrated in FIG. 2, the server 10 is configured with a control unit 110, an input unit 120, a display unit 130, a storage unit 140, and a communication interface unit 150 which are connected via a bus 160.

The control unit 110 may be configured with a CPU (Central Processing Unit), control the entire server 10, and implement various devices described later in cooperation with such hardware by reading and executing programs stored in the storage unit 140, for example.

The storage unit 140 can be realized by a hard disk, a semiconductor memory, or the like. The input unit 120 can be realized with a keyboard, a mouse, or the like. The display unit 130 can be realized with a liquid crystal display, a cathode-ray tube CRT, or the like. The communication interface unit 150 can be realized with a LAN adapter, a modem adapter, or the like.

The aforementioned example mainly describes the server 10; however, the aforementioned function may be provided by installing a program into a computer and running the computer as a server apparatus. Accordingly, the function that is realized by the server described as an embodiment according to the present invention may be provided by performing the aforementioned method using the computer, or by installing the aforementioned program in the computer and executing it.

[Hardware Structure of Terminal 20]

Here, the terminals 20 may have the same structure as the aforementioned server 10. It should be noted that the terminals 20 may be communication terminals other than so-called general purpose computers (PCs), such as cellular phones, PDAs (personal data assistants), or the like.

The terminal 20 is configured with a control unit 210, an input unit 220, a display unit 230, a storage unit 240, and a communication interface unit 250 which are connected via a bus 260.

[System Functional Structure]

Figure 3:
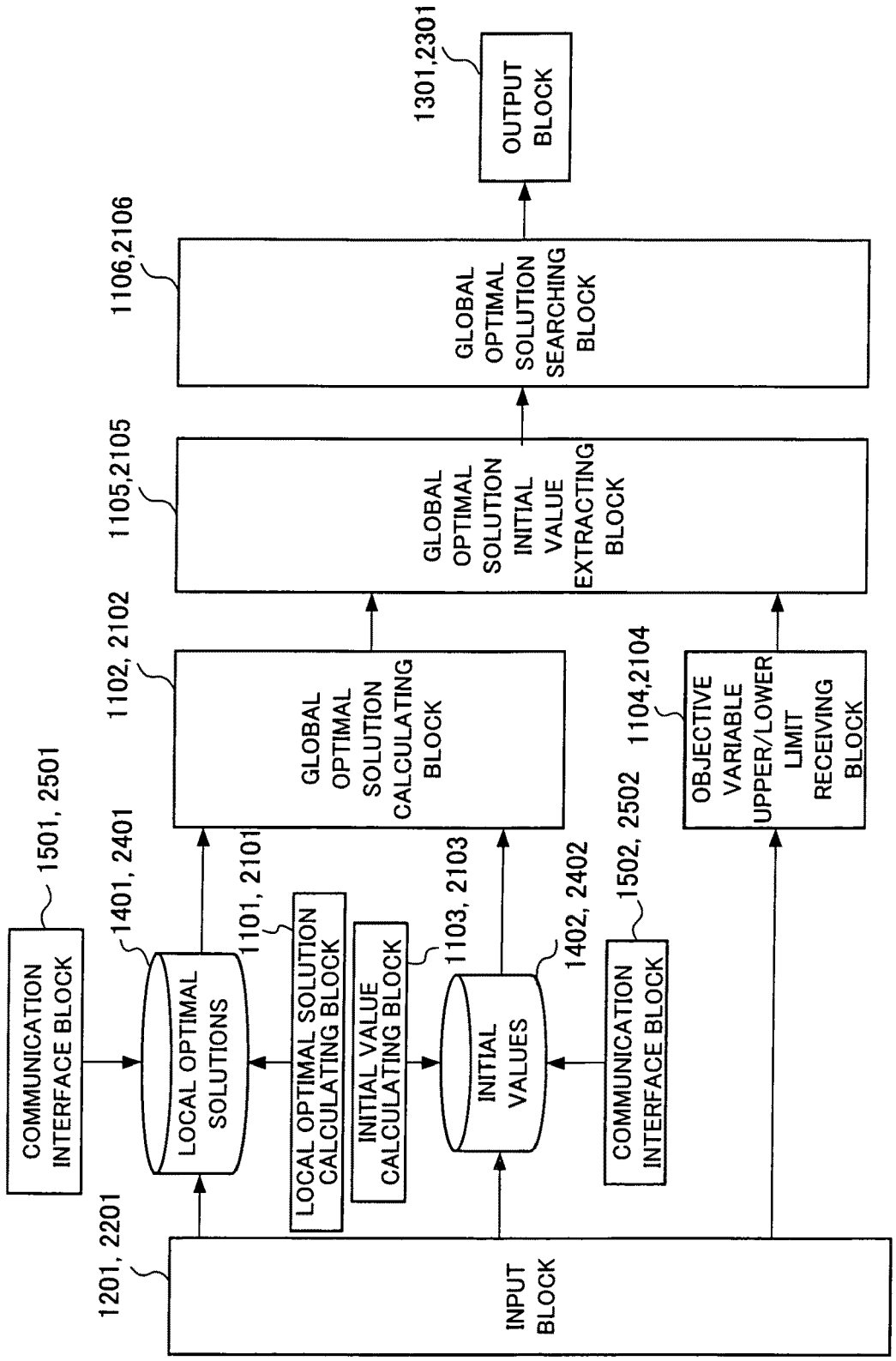
FIG. 3 is a functional block diagram of the server 10 and the terminal 20 according to one example of the preferred embodiment of the present invention.

FIG. 3 is a functional block diagram of the server 10 and the terminal 20 of the preferred embodiment of the present invention;

The input unit 120 of the server 10 configures an input block 1201. Similarly, the input unit 220 of the terminal 20 configures an input block 2201. Moreover, the communication interface unit 150 of the server 10 configures a communication interface block 1501 and a communication interface block 1502. Similarly, the communication interface unit 250 of the terminal 20 configures a communication interface block 2501 and a communication interface block 2502. Furthermore, the control unit 110 of the server 10 configures a local optimal solution calculating block 1101, a global optimal solution calculating block 1102, an initial value calculating block 1103, an objective variable upper/lower limit receiving block 1104, a global optimal solution initial value extracting block 1105, and a global optimal solution searching block 1106. Similarly, the control unit 210 of the terminal 20 configures a local optimal solution calculating block 2101, a global optimal solution calculating block 2102, an initial value calculating block 2103, an objective variable upper/lower limit receiving block 2104, a global optimal solution initial value extracting block 2105, and a global optimal solution searching block 2106. In addition, the storage unit 140 of the server 10 is stored with local optimal solutions 1401 and initial values 1402. Similarly, the storage unit 240 of the terminal 20 is stored with local optimal solutions 2401 and initial values 2402. Moreover, the display unit 130 of the server 10 configures an output block 1301. Similarly, the display unit 230 of the terminal 20 configures an output block 2301.

As mentioned above, the server 10 and the terminals 20 of the preferred embodiment of the present invention may have the same structure as each other, or alternatively, they may achieve the present invention in cooperation with each other by configuring a so-called client/server by connecting to each other via the communication network 30.

[Global Optimal Solution Calculation Processing]

Figure 4:
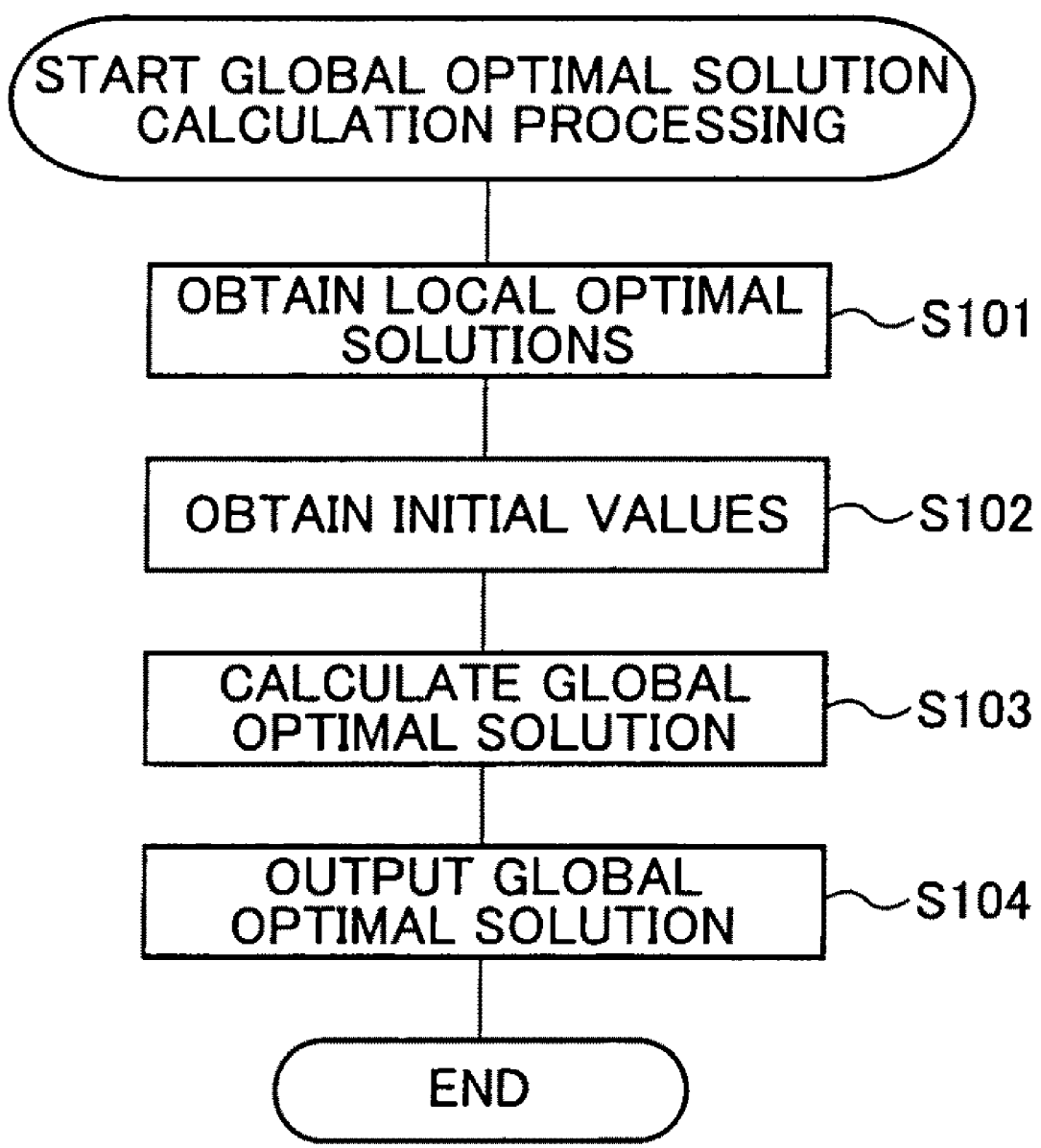
FIG. 4 is a flowchart showing the flow of a global optimal solution calculation processing according to one example of the preferred embodiment of the present invention.

FIG. 4 is a flowchart showing a flow of global optimal solution calculation processing according to one example of the preferred embodiment of the present invention. It should be noted that, although the present invention is not limited to the method of obtaining the global optimal solutions, processing is explained as an example of means for obtaining the global optimal solutions, in which global optimal solutions are obtained as a set of combinations of the plurality of design variables which minimize or maximize a sum of the plurality of objective variables for the plurality of combinations of the plurality of operating states and for the plurality of combinations of the plurality of objective variables.

In addition, the server 10 and the terminals 20 of the preferred embodiment of the present invention may achieve the present invention in cooperation with each other as mentioned above. Here, a case of configuring a so-called client/ server is mainly described; however, the technical scope of the present invention is not limited thereto.

Initially, in Step S101, the local optimal solutions 1401 or the local optimal solutions 2401 are obtained. More specifically, the input block 1201 or the input block 2201 of the server 10 or terminal 20 may receive an input from a user. Alternatively, the input block 2201 of the terminal 20 may receive an input from a user, and the communication interface block 1501 of the server 10 may receive it via the communication network 30. Alternatively, the local optimal solution calculating block 1101 of the server 10 may calculate the local optimal solutions 1401 (or the local optimal solutions 2401).

Next, in Step S102, the initial values 1402 or the initial values 2402 are obtained. More specifically, the input block 1201 or the input block 2201 of the server 10 or terminal 20 may receive an input from a user. Alternatively, the input block 2201 of the terminal 20 may receive an input from a user, and the communication interface block 1501 of the server 10 may receive it via the communication network 30. Furthermore, as described in detail below while referring to FIG. 6, the initial value calculating block 1103 or the initial value calculating block 2103 may calculate the initial values 1402 (or the initial values 2402).

Next, in Step S103, global optimal solutions are calculated. More specifically, the global optimal solution calculating block 1102 of the server 10 may calculate the global optimal solutions based on the local optimal solutions 1401 or the local optimal solutions 2401 and the initial values 1402 or the initial values 2402.

Next, in Step S104, the global optimal solutions are output. More specifically, the output block 1301 of the server 10 may output (display) the global optimal solutions. Alternatively, the global optimal solutions transmitted from the server 10 to the terminal 20 via the communication network 30 may be output (displayed) by the output block 2301 of the terminal 20.

FIGS. 5A to 5D are diagrams describing a concept of global optimal solution calculation processing according to one example of the preferred embodiment of the present invention;

Here, an example is given for a case of calculating global optimal solutions of design variables which minimize or maximize a combination of two objective variables (specific fuel consumption and nitrogen oxides emission concentration) for three combinations (modes) of multiple operating states (e.g., engine revolution speed, loads, and the like) included in an engine operating range.

As illustrated in FIGS. 5A, 5B, and 5C, local optimal solutions of the design variables for three modes (mode 1 to mode 3) are calculated and input, respectively. In this embodiment, a set of global optimal solutions (global Pareto solutions) is calculated based on these three local optimal solutions (see FIG. 5D). In this case, in one example of the preferred embodiment of the present invention, the set of global optimal solutions (global Pareto solutions) may be efficiently calculated with fewer generation numbers by inputting the initial values appropriately using a genetic algorithm.

FIGS. 6A to 6D are diagrams illustrating a concept of initial value calculation processing according to one example of the preferred embodiment of the present invention; As illustrated in FIGS. 6A to 6C, when there are n modes for the two objective variables of specific fuel consumption and NOx (nitrogen oxides) emission concentration, for example, suffixes indicating NOx emission concentrations are appended in ascending order to local optimal solutions of the n design variables in each mode. More specifically, for example, for mode 1, the first local optimal solution is $D_{11}$, the second local optimal solution is $D_{12}, \ldots$, and the nth local optimal solution is $D_{1n}$. In addition, for mode 2, the first local optimal solution is $D_{21}$, the second local optimal solution is $D_{22}, \ldots$, and the nth local optimal solution is $D_{2n}$. In this manner, suffixes are appended to the local optimal solutions, and furthermore, of the local optimal solutions for each mode, the local optimal solutions which correspond to each other when arranged in ascending order of NOx emission concentrations are then summated. More specifically, for example, the local optimal solutions for the number of modes such as $D_{11}, D_{21}, \ldots$ are summated. In addition, the resulting value is then adopted as one of the initial values for calculating the set of global optimal solutions (FIG. 6D).

A similar calculation is performed for all local optimal solutions. More specifically, for the nth local optimal solution in the aforementioned example, local optimal solutions for the number of modes such as $D_{1n}, D_{2n}, \ldots$, are summated. The set of global optimal solutions is calculated based on the initial values calculated as described above. In this manner, the set of global optimal solutions is calculated more efficiently using a genetic algorithm based on the relatively more appropriate initial values.

It should be noted that, as illustrated in FIGS. 6A to 6D, products of a predetermined weight multiplied by each mode (specifically, weights for respective local optimal solutions, for example, $W_1$ for the first local optimal solution $D_{11}$, $W_2$ for the second local optimal solution $D_{12}, \ldots$, and $W_n$ for the nth local optimal solution $D_{1n}$) may be summated when summating the local optimal solutions. In this case, the weights are reflected in the obtained global optimal solutions.

FIGS. 7A to 12 are diagrams respectively showing exemplary output (display) results of global optimal solution calculation processing according to one example of the preferred embodiment of the present invention.

FIG. 7A and FIG. 7B, and FIG. 8A and FIG. 8B show comparative results that are compared between calculation results of 250 generation numbers, 1000 generation numbers, 2500 generation numbers, and 5000 generation numbers using a genetic algorithm without inputting initial values for two objective variables (specific fuel consumption (q) and nitrogen oxides emission concentration (NOx)) by a conventional method, and results of a simple summation of respective local optimal solutions (objective solutions) in the case of mode 13.

Figure 7A:
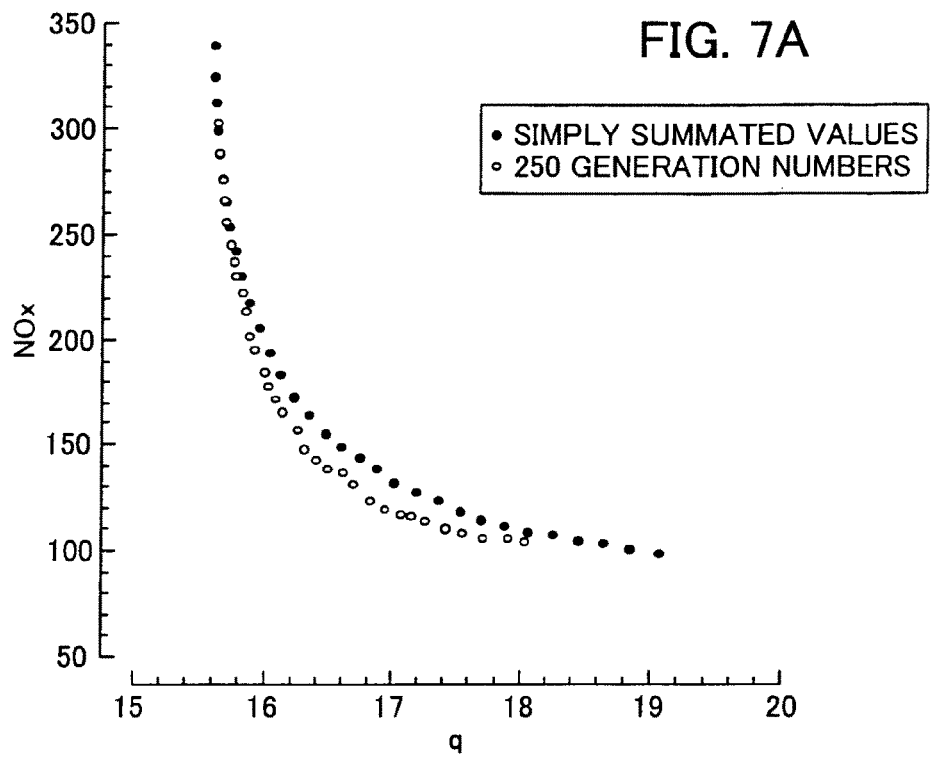
FIGS. 7A and 7B are diagrams respectively showing exemplary output (display) results of conventional global optimal solution calculation processing.

In FIG. 7A, the calculation results using a genetic algorithm cannot sufficiently express the objective solutions for both ends of the set of global optimal solutions, that is, a portion where q is low and NOx is high, and a portion where q is high and NOx is low.

Figure 7B:
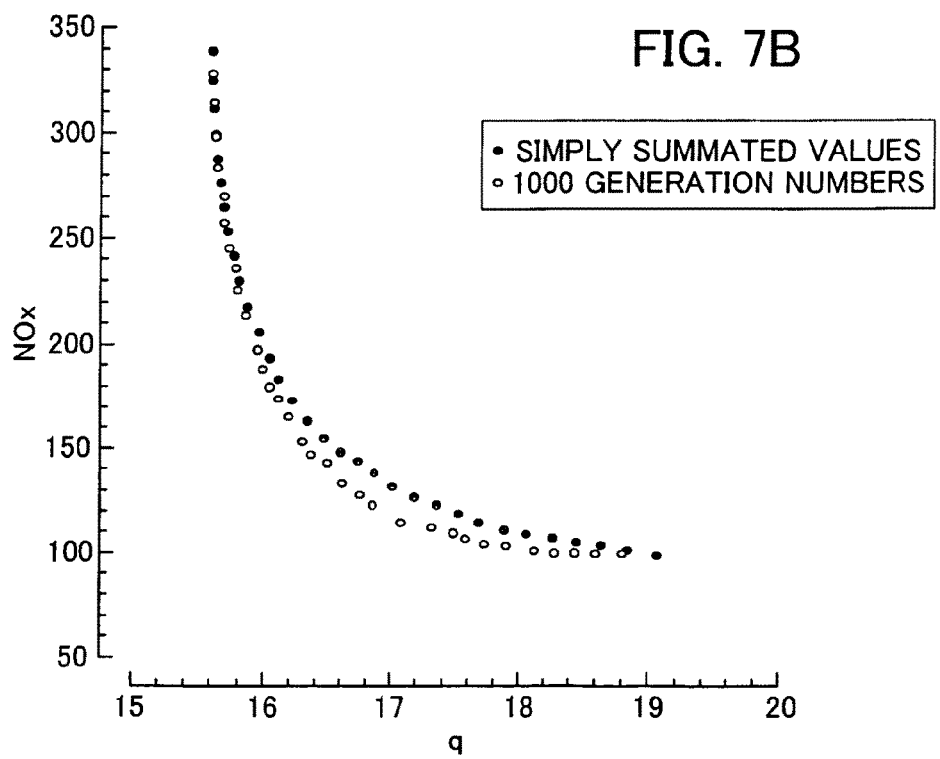
Figure 8A:
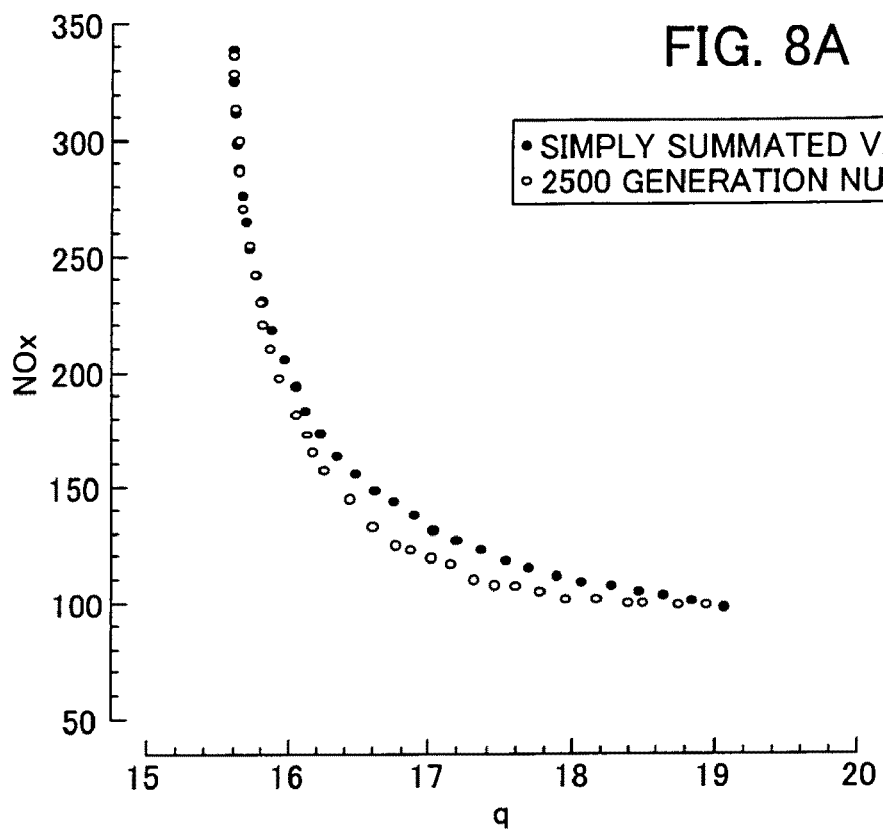
FIGS. 8A and 8B are diagrams respectively showing exemplary output (display) results of conventional global optimal solution calculation processing.
Figure 8B:
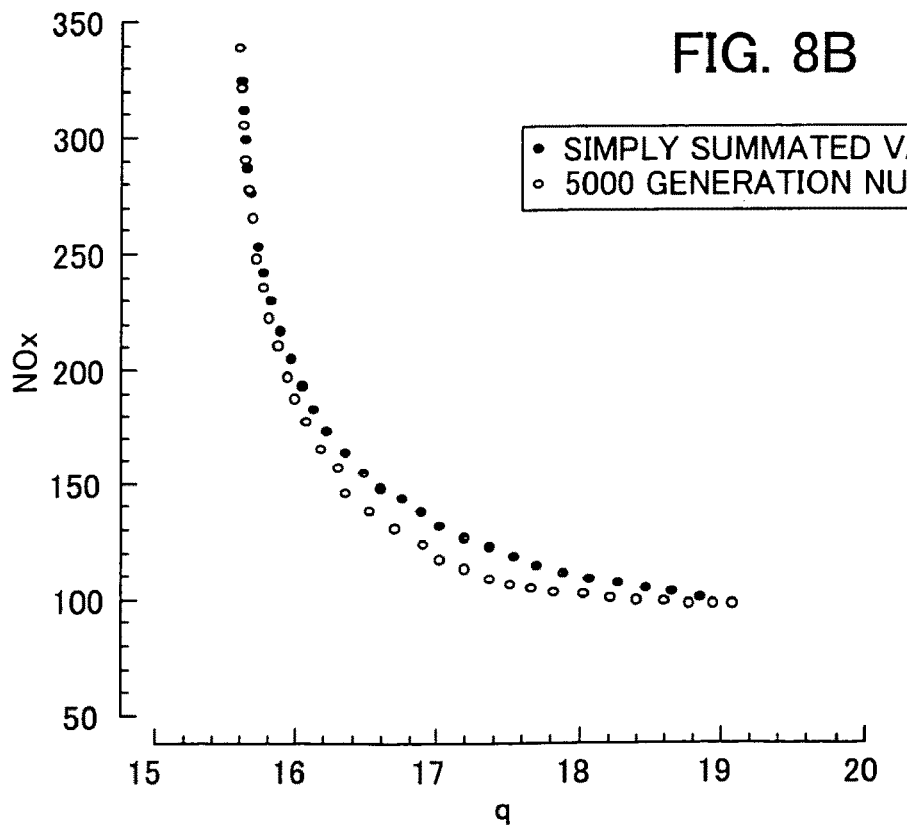

It is apparent from FIG. 7B and subsequent drawings that the aforementioned problem may be gradually alleviated by increasing the generation numbers, and it is apparent from FIG. 8B that calculation results can be obtained that are almost the same as the objective solutions as a result of calculating 5000 generation numbers.

Figure 9:
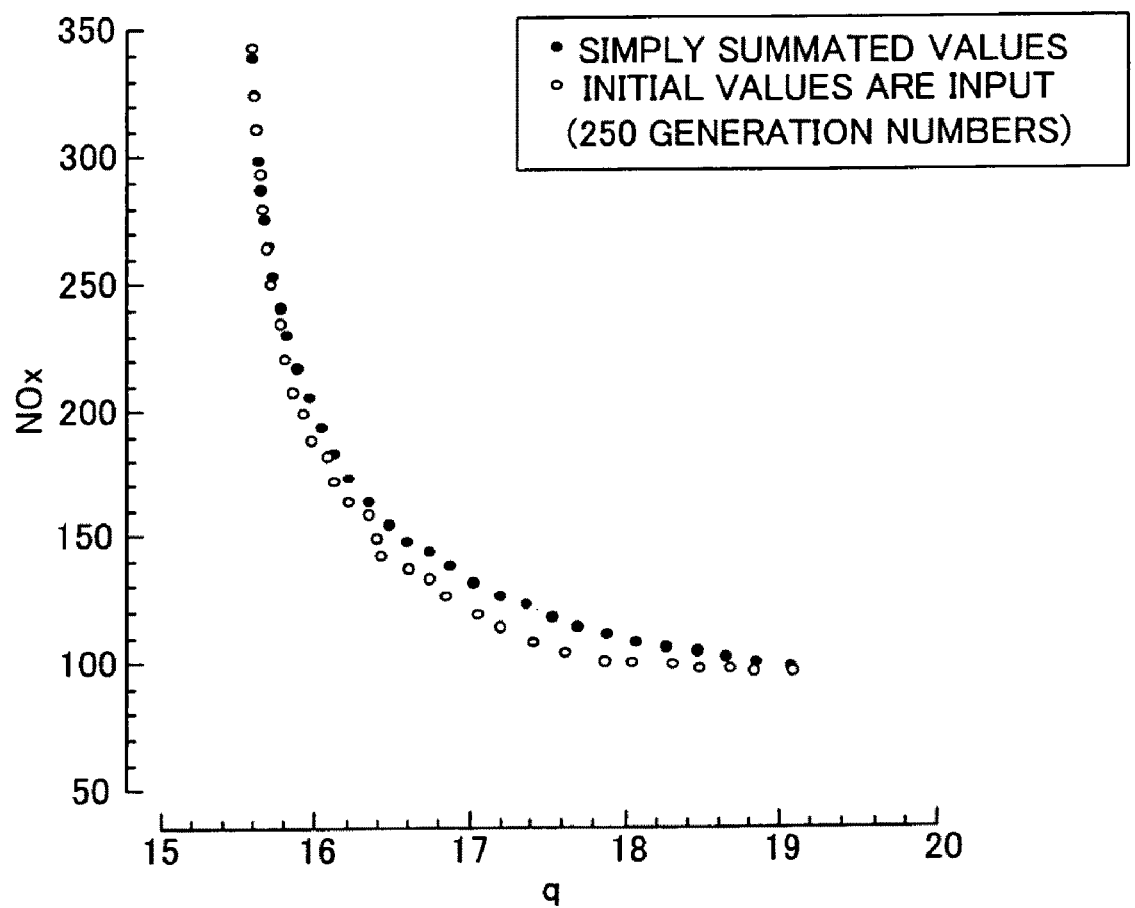
FIG. 9 is a diagram showing an exemplary output (display) result of global optimal solution calculation processing according to one example of the preferred embodiment of the present invention.

FIG. 9 shows a result of calculating 250 generation numbers by inputting initial values when using a genetic algorithm as one example of the preferred embodiment of the present invention. As can be understood from the drawing, it is possible to obtain calculation results almost the same as the objective solutions even if generation numbers are few. Calculation efficiency may be improved by (5000−250)/5000=95% for generation numbers compared to the conventional method.

Similarly, FIG. 10A and FIG. 10B, and FIG. 11A and FIG. 11B show, in the case of mode 51, by the conventional method, comparative results for calculation results of 250 generation numbers, 1000 generation numbers, 2500 generation numbers, and 5000 generation numbers using a genetic algorithm without inputting initial values for two objective variables (specific fuel consumption (q) and nitrogen oxides emission concentration (NOx)), and results of simple summation of respective local optimal solutions (objective solutions).

In FIG. 10A, calculation results using a genetic algorithm cannot sufficiently express the objective solutions for both ends of the set of global optimal solutions, that is, a portion where q is low and NOx is high, and a portion where q is high and NOx is low. Even compared to the case of mode 13 in FIG. 7A, the area that is insufficient becomes larger.

Figure 11A:
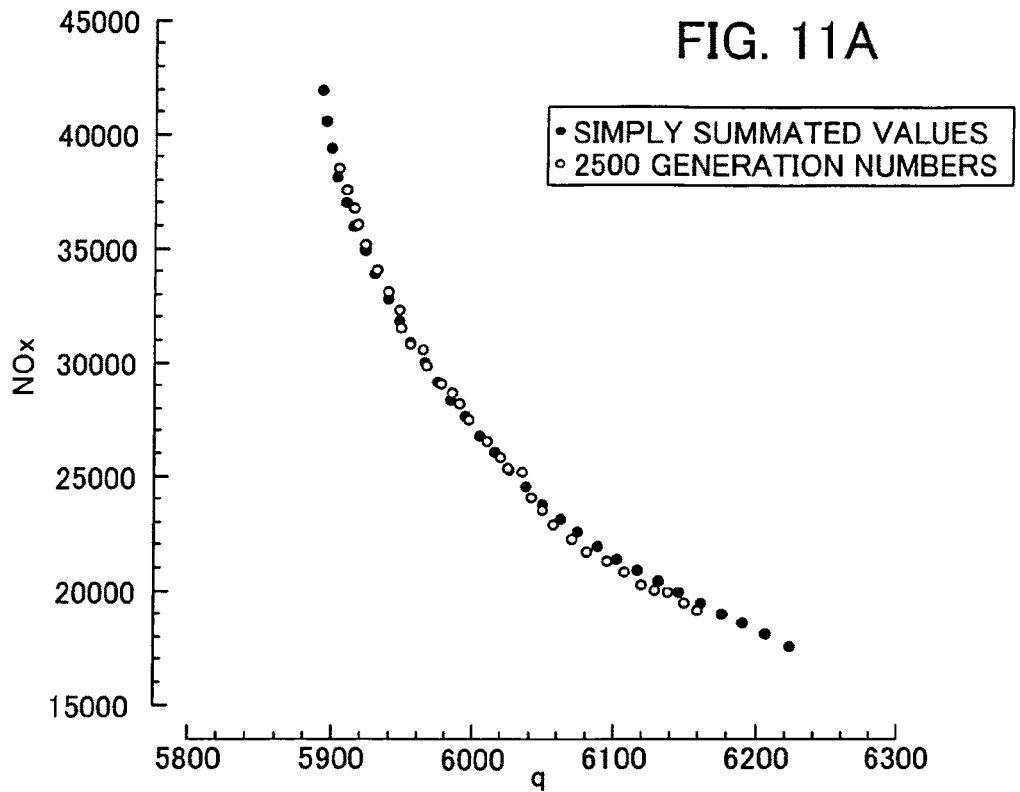
FIGS. 11A and 11B are diagrams respectively showing exemplary output (display) results of conventional global optimal solution calculation processing.
Figure 11B:
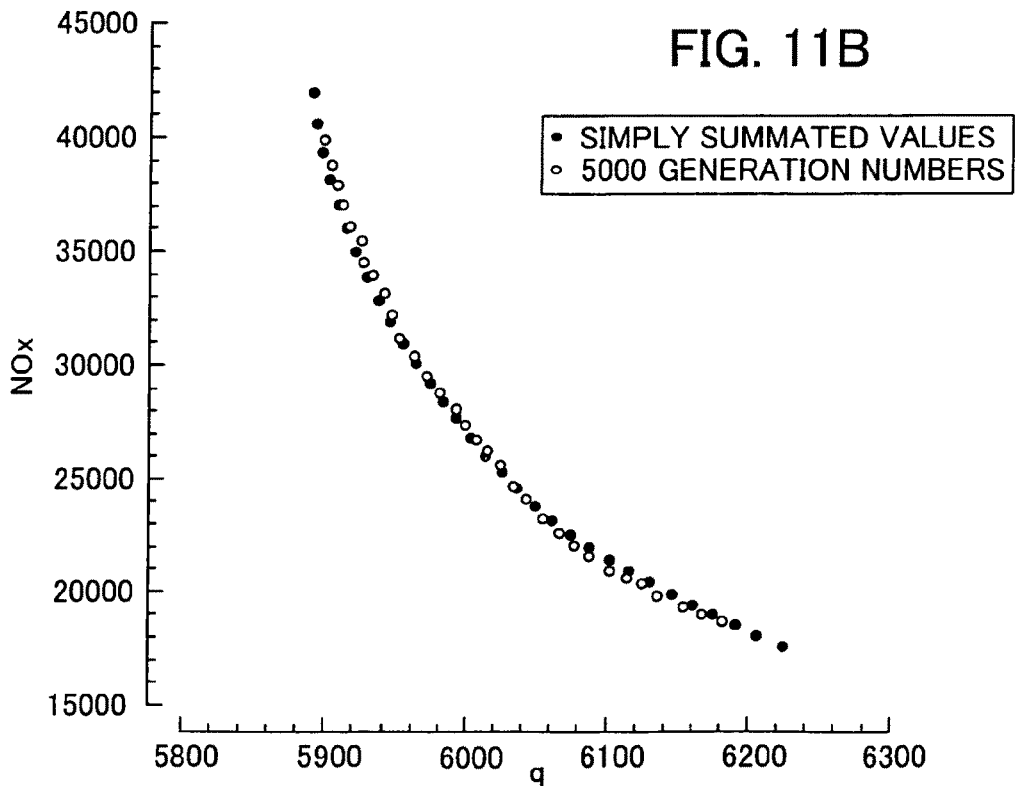

It is apparent from FIG. 10B and subsequent drawings that the aforementioned problem may be gradually alleviated by increasing the generation numbers, and the fact that calculation results almost the same as the objective solutions may be obtained as a result of calculating 5000 generation numbers is apparent from FIG. 11B. Nevertheless, when compared to the case of mode 13 in FIG. 8B, the larger area that is insufficient still remains.

FIG. 12 shows a result of calculating 250 generation numbers by inputting initial values when using a genetic algorithm as one example of the preferred embodiment of the present invention. As can be understood from the drawing, it is possible to obtain calculation results almost the same as the objective solutions even if generation numbers are few. Calculation efficiency may be improved by (5000−250)/5000=95% for generation numbers compared to the conventional method. In addition, there is almost no insufficient area, indicating that objective solutions are being further preferably calculated than the calculation results of 5.000 generation numbers using the conventional method.

[Design Variable Calculation Processing Based on Smoothness]

Figure 13:
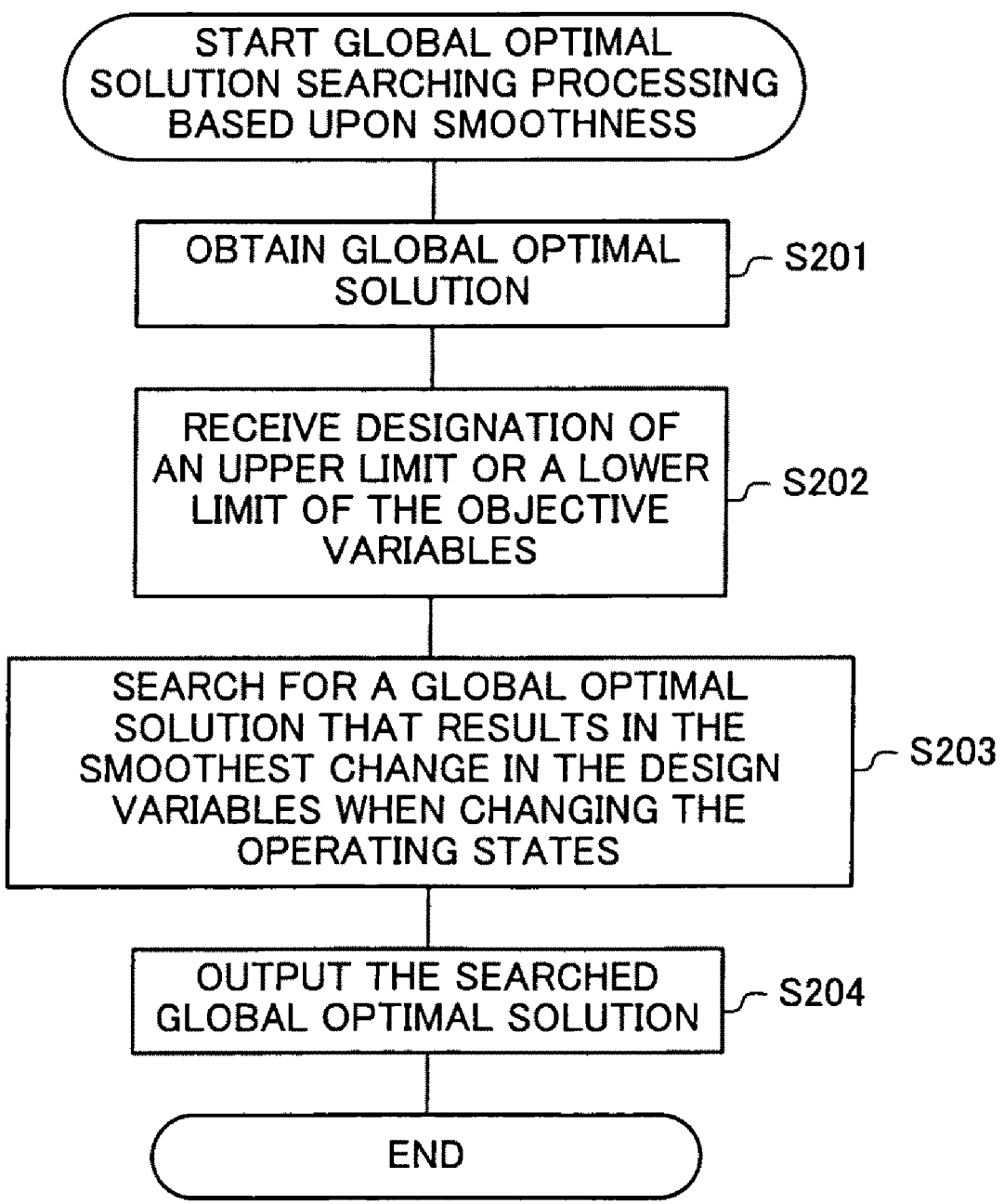
FIG. 13 is a flowchart showing a flow of global optimal solution searching processing based upon smoothness according to one example of the preferred embodiment of the present invention.
Figures 18A, 18B, 18C, 18D, 18E:
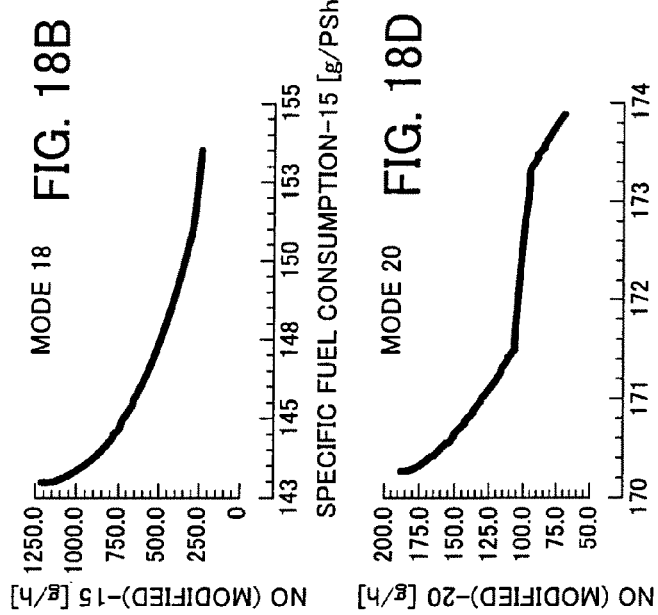
FIGS. 18A to 18E are diagrams respectively showing exemplary local solutions (Pareto solutions) of minimizing objective variables according to one example of the preferred embodiment of the present invention.
Figure 19A:
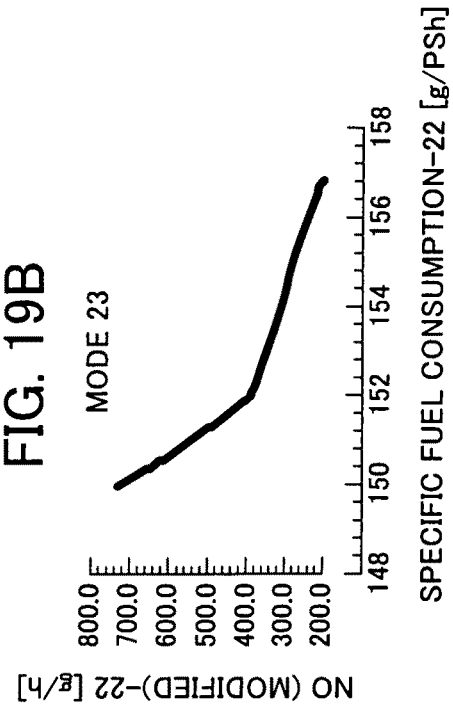
FIGS. 19A to 19D are diagrams respectively showing exemplary local solutions (Pareto solutions) of minimizing objective variables according to one example of the preferred embodiment of the present invention.
Figure 19B:
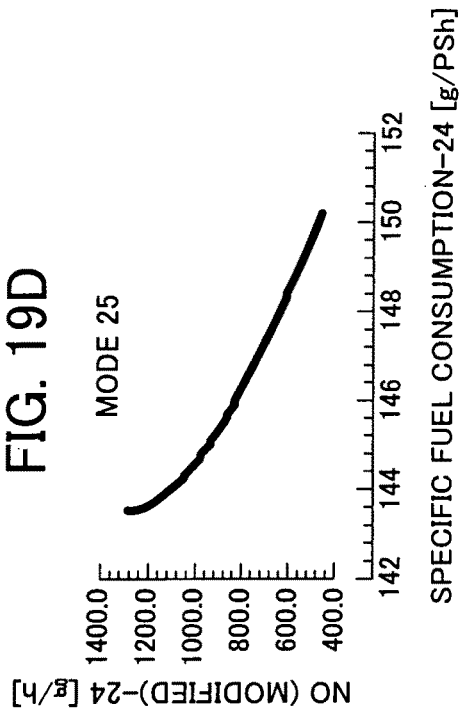
Figure 19C:
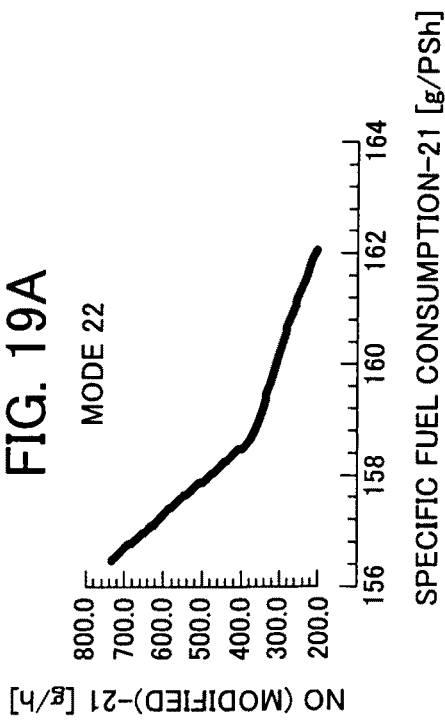
Figure 19D:
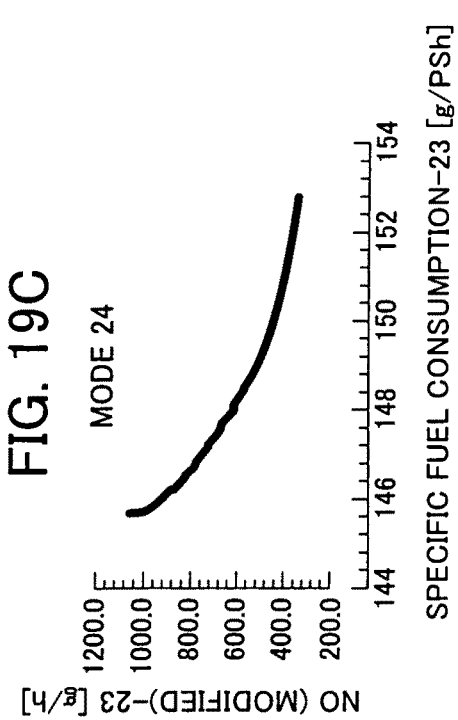

FIG. 13 is a flowchart showing a flow of exemplary global optimal solution searching processing based upon smoothness according to one example of the preferred embodiment of the present invention.

It should be noted that the server 10 and the terminals 20 according to one example of the preferred embodiment of the present invention may achieve the present invention in cooperation with each other as mentioned above. Here, a case of configuring a so-called client/server is mainly described; however, the technical scope of the present invention is not limited thereto.

Next, the global optimal solutions are obtained in Step S201. More specifically, the calculation may be performed by the above-mentioned global optimal solution calculating block 1102 or the global optimal solution calculating block 2102. Alternatively, the input block 1201 or the input block 2201 of the server 10 or terminal 20 may receive an input from a user. Alternatively, the input block 2201 of the terminal 20 may receive an input from a user, and the communication interface block 1501 of the server 10 may receive it via the communication network 30. Thus, the present invention presumes that global optimal solutions are obtained as a set of combinations of the plurality of design variables which minimize or maximize a sum of the plurality of objective variables for the plurality of combinations of the plurality of operating states and for the plurality of combinations of the plurality of objective variables.

Next, in Step S202, the input block 1201 or the input block 2201 receives an input from the user, thereby receiving designation of an upper limit or a lower limit of the objective variables. It should be noted that, as described later in detail, while the output block 1301 or the output block 2301 displays the global optimal solutions, the designation input may be received from the user via an input device such as a mouse. In this way, the user can designate an upper limit or a lower limit of the objective variables while viewing the global optimal solutions, and this is more preferable.

Next, in Step S203, the global optimal solution searching block 1106 or the global optimal solution searching block 2106 searches for global optimal solutions that result in the smoothest change in the design variables when changing the operating states. It should be noted that, as described later in detail, the global optimal solution initial value extracting block 1105 or the global optimal solution initial value extracting block 2105 may extract one of the global optimal solutions as an initial value set in a range that does not exceed the upper limit or the lower limit of the objective variables from the global optimal solutions, and may calculate design variables starting from the initial value set in sequence. Alternatively, the input block 1201 or the input block 2201 may receive an input from the user, thereby searching for global optimal solutions, in which one of the global optimal solutions is designated as an initial value set.

Moreover, as described later in detail, the global optimal solution searching block 1106 or the global optimal solution searching block 2106 may search for global optimal solutions so that the square-sum of the remainder of fitting to the quadratic surface is minimized. In this way, the global optimal solution searching block 1106 or the global optimal solution searching block 2106 can search for global optimal solutions that result in the smoothest change in the design variables when changing the operating states.

Next, in Step S204, the output block 1301 or the output block 2301 outputs the searched global optimal solutions. It should be noted that, as described later in detail, the output block 1301 or the output block 2301 may display the searched global optimal solutions together with the upper limit and the lower limit of the design variables as well as the other global optimal solutions by means of a graph. That is, Step S204 is a step in which the change in the design variables in relation to the operating states is displayed regarding the searched global optimal solutions. More preferably, Step S204 is a step in which the searched global optimal solutions are displayed as a graph of the change in the design variables in relation to the change in the operating states. In this way, the user can confirm the searched global optimal solutions, while viewing the upper limit or the lower limit of the design variables as well as the other global optimal solutions which are displayed in the graph. Furthermore, the output block 1301 or the output block 2301 may display the change in the design variables by means of a quadratic surface when changing the operating states, based upon the searched global optimal solutions or the other various global optimal solutions. In this way, the user can visually confirm that a set of global optimal solutions has been searched from among the global optimal solutions, which result in the smoothest change in the design variables when changing the operating sates.

[Example of Local Optimum Solutions (Pareto Solutions)]

FIGS. 14A to 19D are diagrams respectively showing exemplary local solutions (Pareto solutions) of minimizing objective variables according to one example of the preferred embodiment of the present invention. In the examples, local optimum solutions (Pareto solutions) are shown in which specific fuel consumption and NOx are objective variables. In this way, the local optimum solutions (Pareto solutions) can be calculated for various operating states (mode 15 in this case).

[Example of Global Optimal Dolution (Pareto Dolution)]

Figure 20:
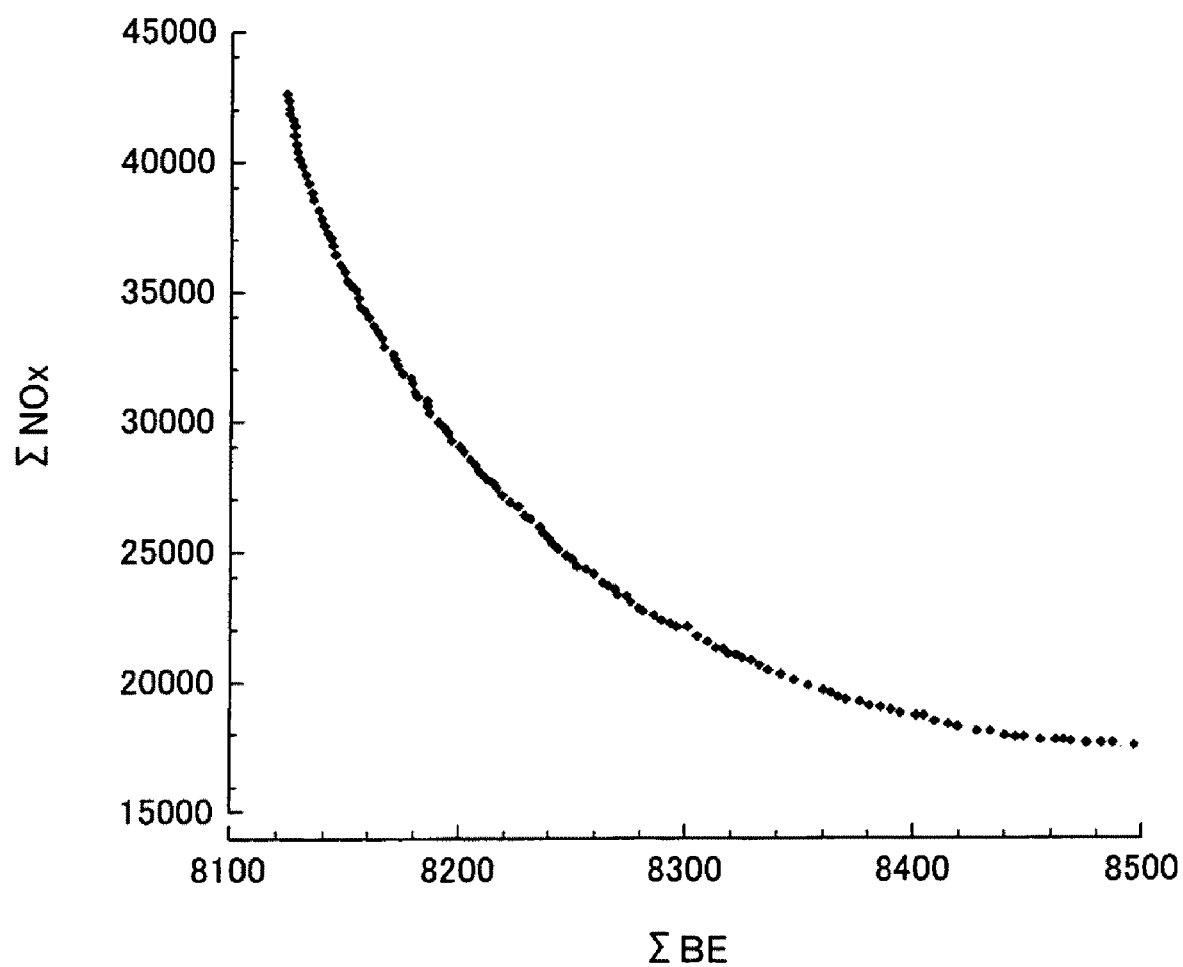
FIG. 20 is a diagram showing an exemplary set of global optimal solutions (Pareto solutions) of minimizing a sum of objective variables, which are specific fuel consumption and NOx, according to one example of the preferred embodiment of the present invention.

FIG. 20 is a diagram showing an exemplary set of global optimal solutions (Pareto solutions) of minimizing a sum of objective variables, which are specific fuel consumption and NOx, according to one example the preferred embodiment of the present invention. As described above, a set of global optimal solutions (Pareto solutions) of minimizing the sum of the objective variables can be calculated by means of a genetic algorithm based upon a plurality of local optimum solutions (Pareto solutions). In the present invention, based upon this set of global optimal solutions, global optimal solutions are searched that result in the smoothest change in the design variables when changing the operating states.

[Search for a Global Optimal Solution]

Figure 21:
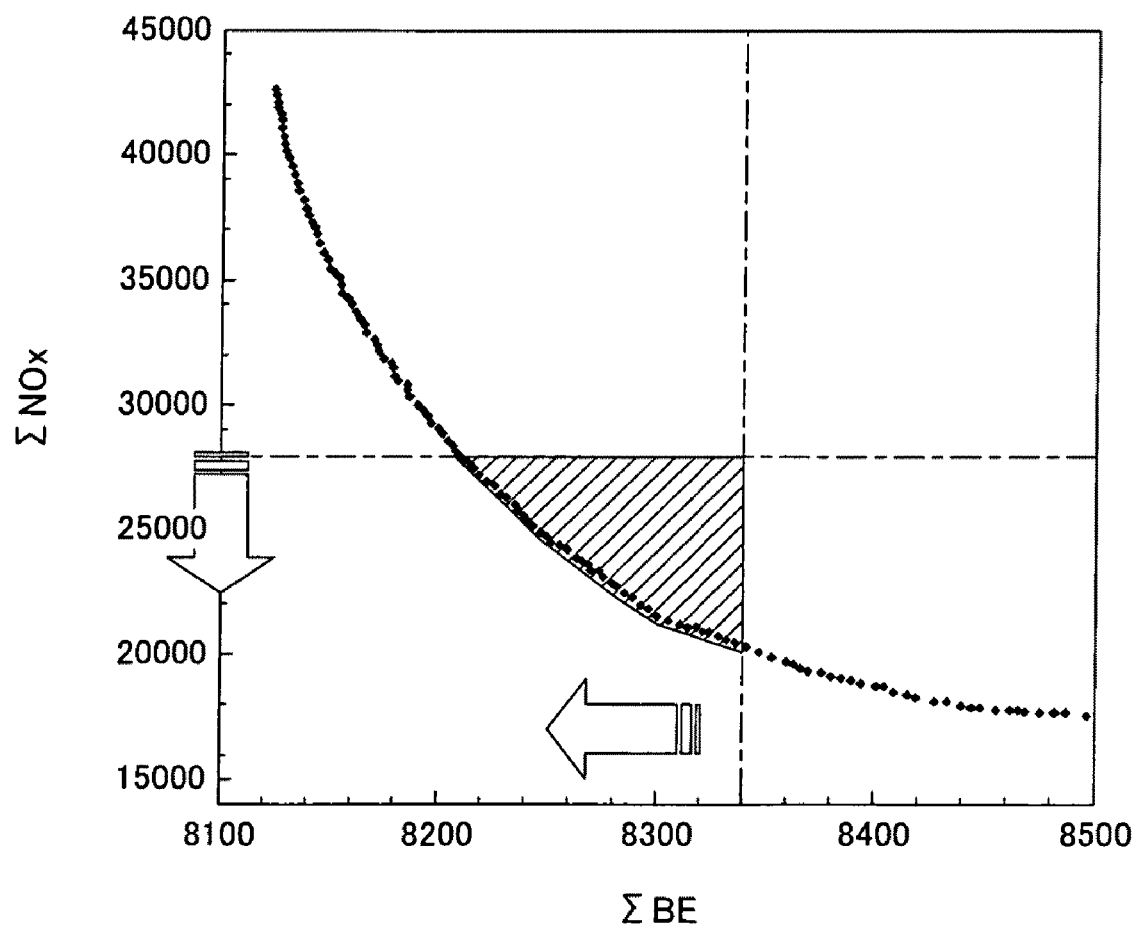
FIG. 21 shows designation of upper limits of objective variables according to one example of the preferred embodiment of the present invention.

FIG. 21 shows a designation of upper limits of objective variables according to one example of the preferred embodiment of the present invention. In this example, upper limits are respectively designated for specific fuel consumption (transverse axis) and NOx (vertical axis). The upper limits are thus set, thereby making it possible to search for global optimal solutions that result in the smoothest change in the design variables when changing the operating states, in a range encompassed by the set of global optimal solutions and the two upper limits. In this way, a set of global optimal solutions (Pareto solutions) is displayed, thereby making it possible for the user to grasp the total performance, and to make a designation by considering the limitation of such upper limits. It should be noted that, although this example shows a case in which upper limits are designated as well, it goes without saying that a lower limit(s) is/are designated in a case of objective variables for which maximization is intended.

[Comparison of Smoothness (Map)]

Figure 22:
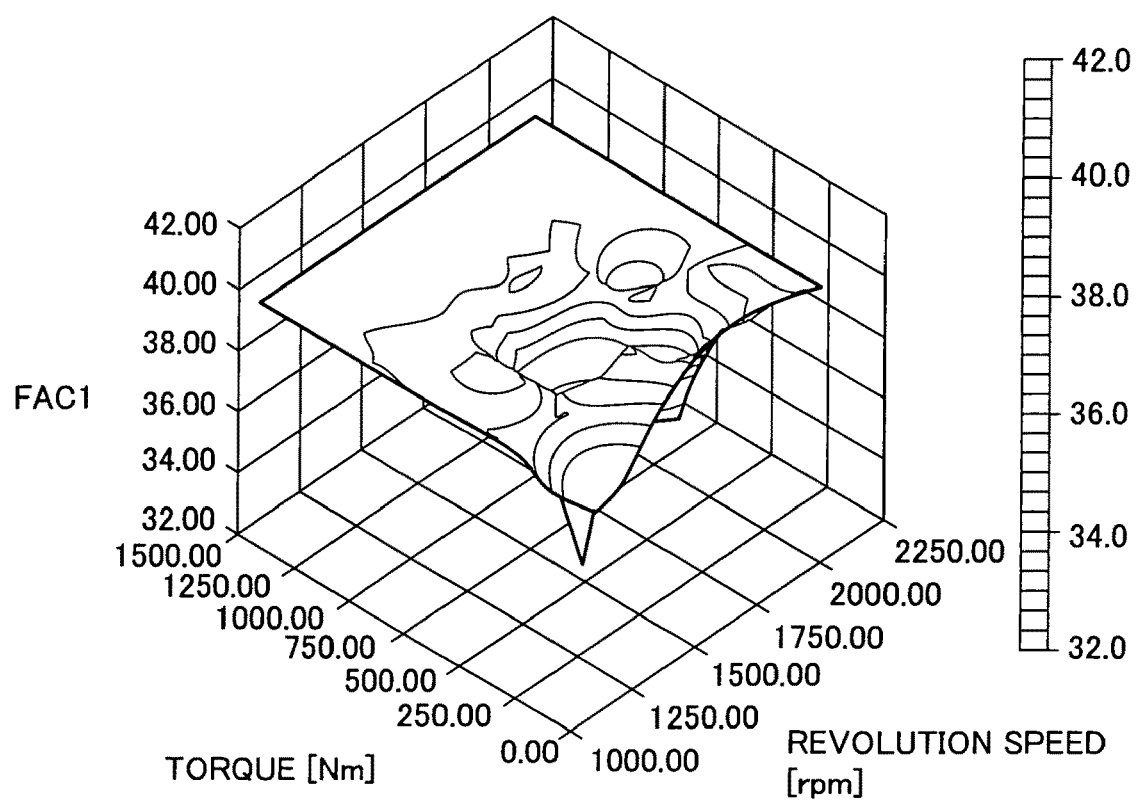
FIG. 22 is a map showing changes of design variables when changing operating states according to one example of a preferred embodiment of the present invention.

FIG. 22 is a map showing changes of design variables when changing operating states according to one example of the preferred embodiment of the present invention. This example, which is a map corresponding to one of the global optimal solutions, is not preferable, since there is a region in which the design variable (FAC1) changes very abruptly in relation to the changes in revolution speed (NE: number of rotations per minute of an engine) and torque (TRQ) as operating states.

Figure 23:
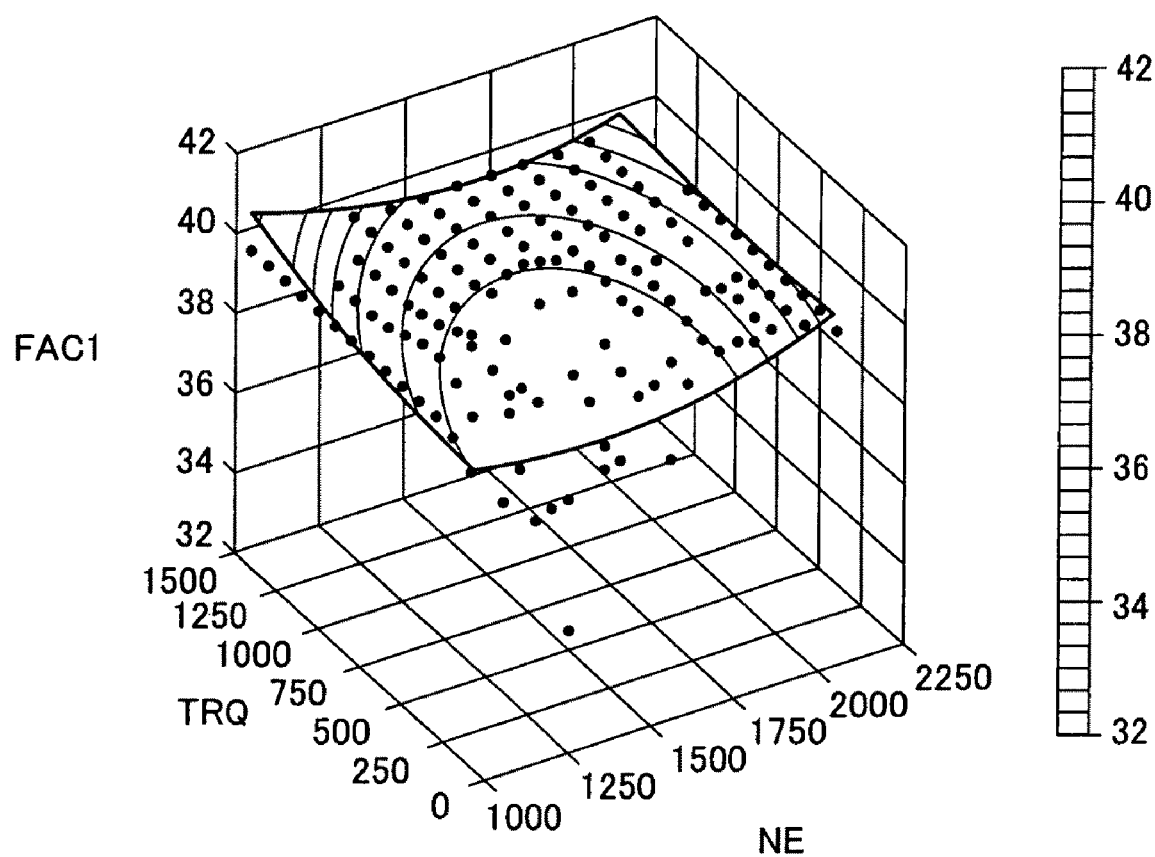
FIG. 23 shows exemplary quadratic surface fitting processing according to one example of a preferred embodiment of the present invention.

FIG. 23 shows quadratic surface fitting processing according to one example of the preferred embodiment of the present invention. In this example, a square-sum value of the remainder of fitting to the quadratic surface is obtained as "an index of smoothness," and global optimal solutions are searched for such that the values are minimized as mush as possible, thereby calculating a smooth map.

Figure 24:
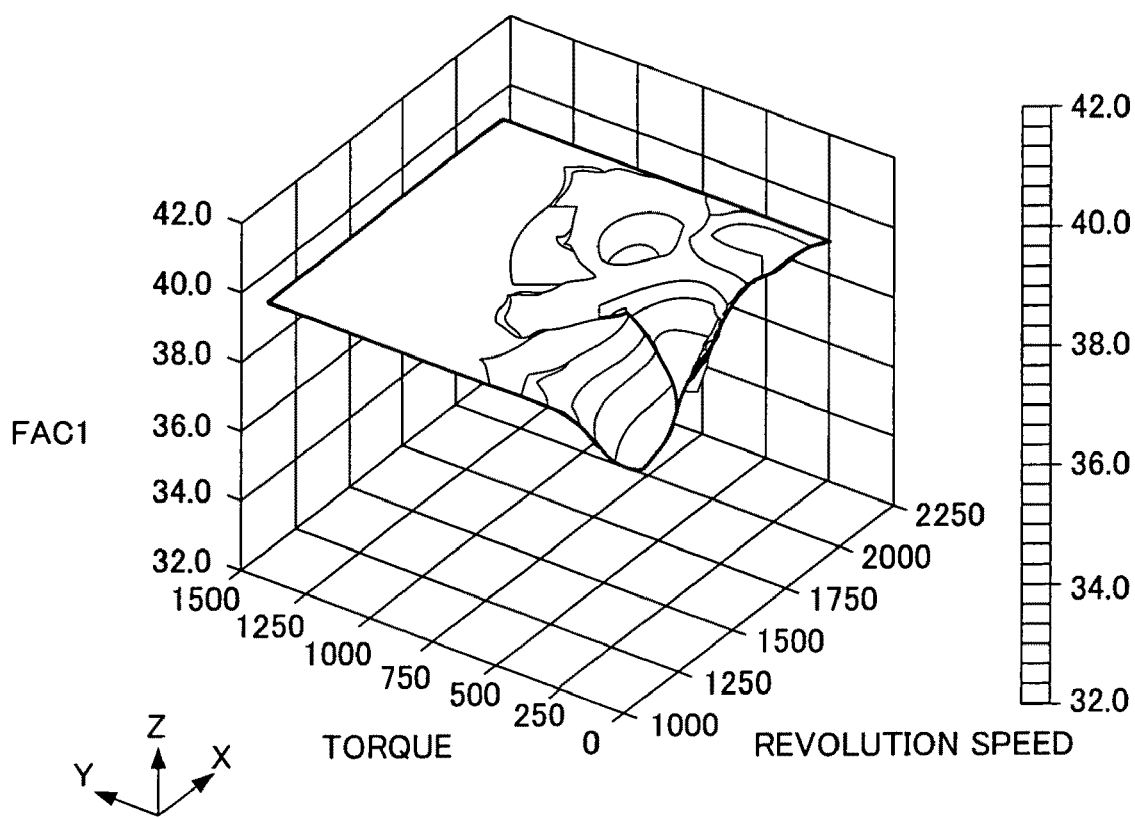
FIG. 24 shows an exemplary smooth map according to one example of the preferred embodiment of the present invention.

FIG. 24 shows an exemplary smooth map according to one example of the preferred embodiment of the present invention. As described above, a combinational problem is solved which minimizes the square-sum of the remainder of fitting to the quadratic surface in a range that does not exceed the designated upper limit, as a result of which such a map is obtained. In this way, the present invention makes it possible to search for global optimal solutions that result in the smoothest change in the design variables when changing the operating states. It is understood that, as compared to the map in FIG. 22, the abruptly changing portion is reduced, and more preferable design variables are obtained.

Figure 25:
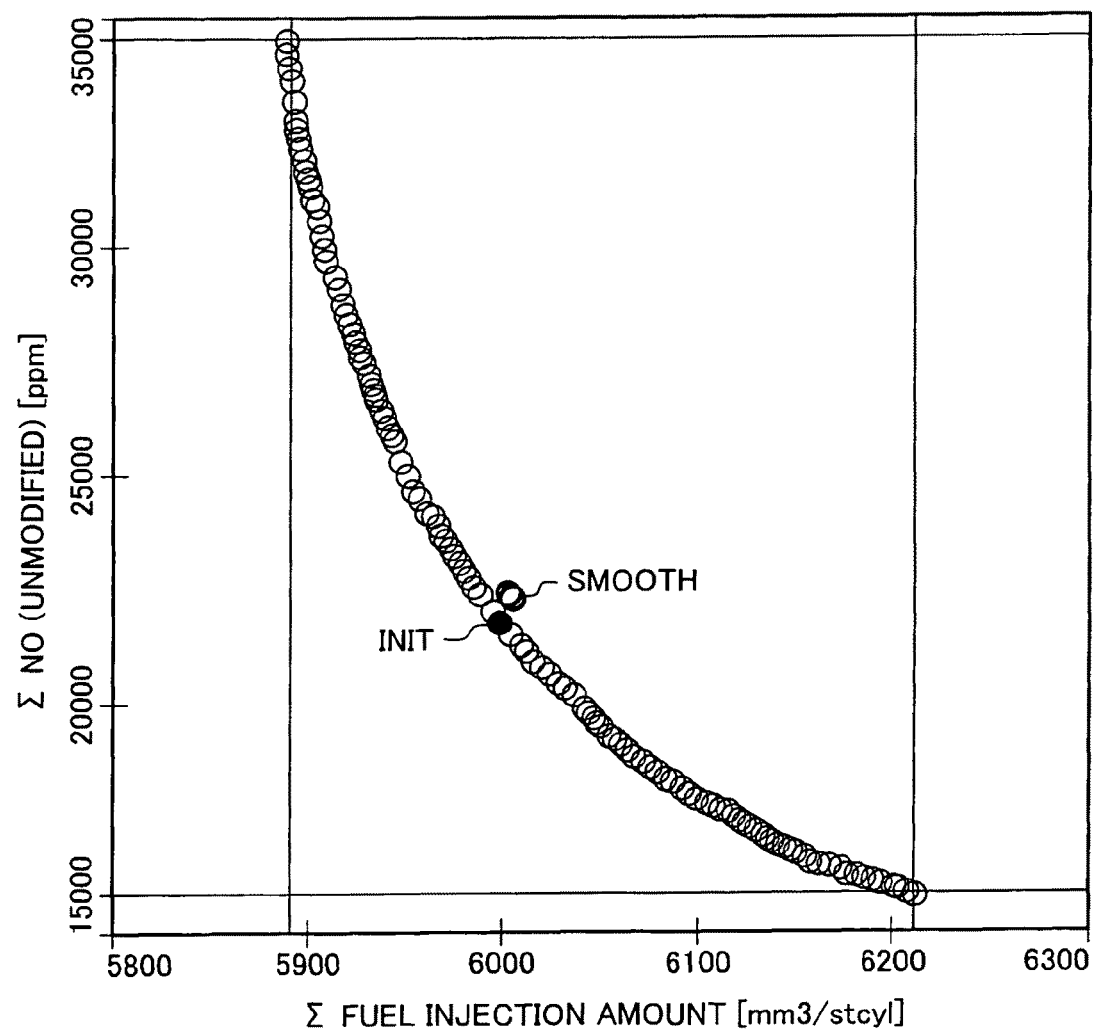
FIG. 25 shows a display screen of global optimal solutions that result in the smoothest change in design variables when changing the global optimal solutions and the operating states according to one example of the preferred embodiment of the present invention.
Figure 26:
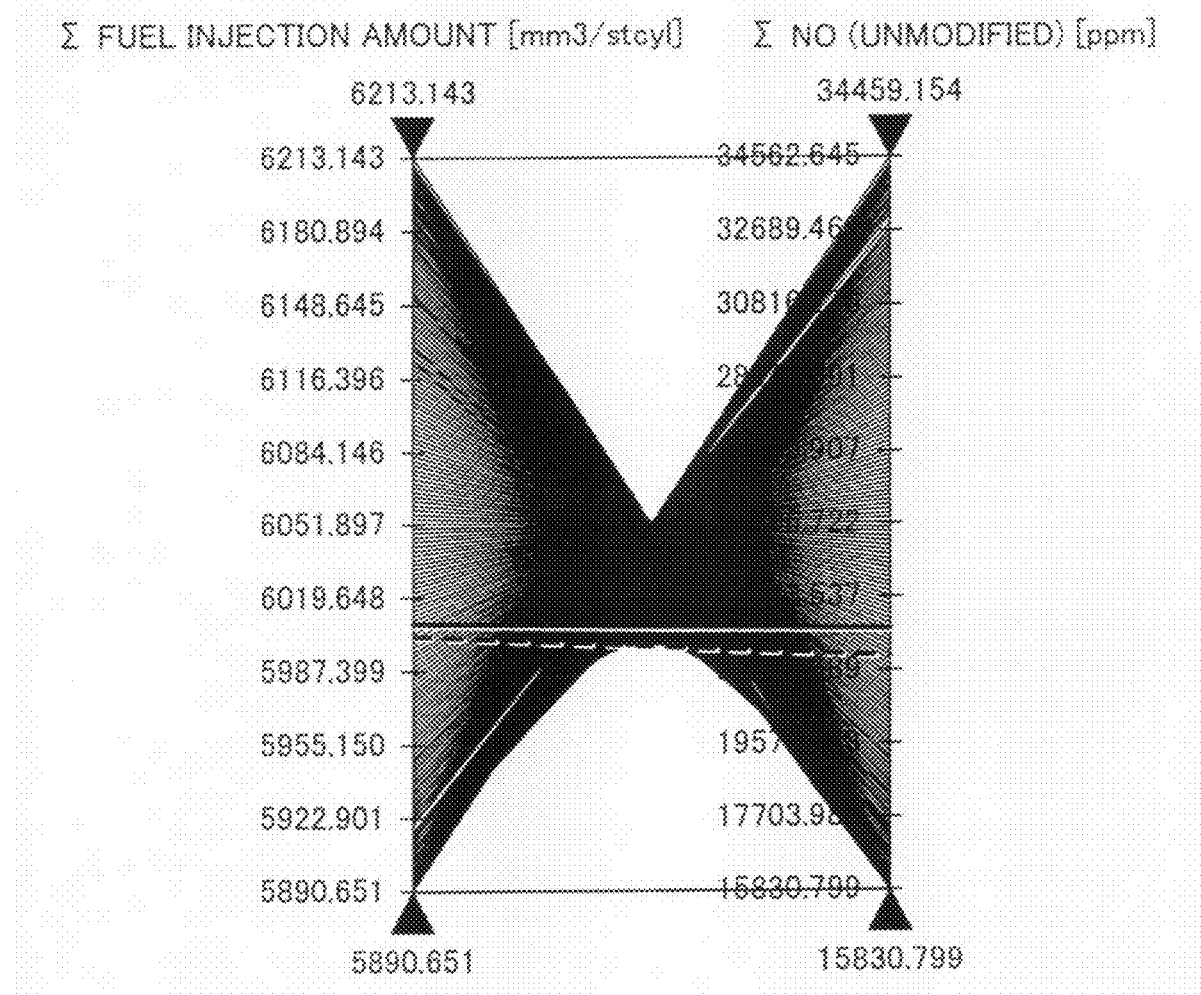
FIG. 26 shows a display screen of global optimal solutions that result in the smoothest change in objective variables when changing the global optimal solutions and the operating states according to one example of the preferred embodiment of the present invention.
Figure 27:
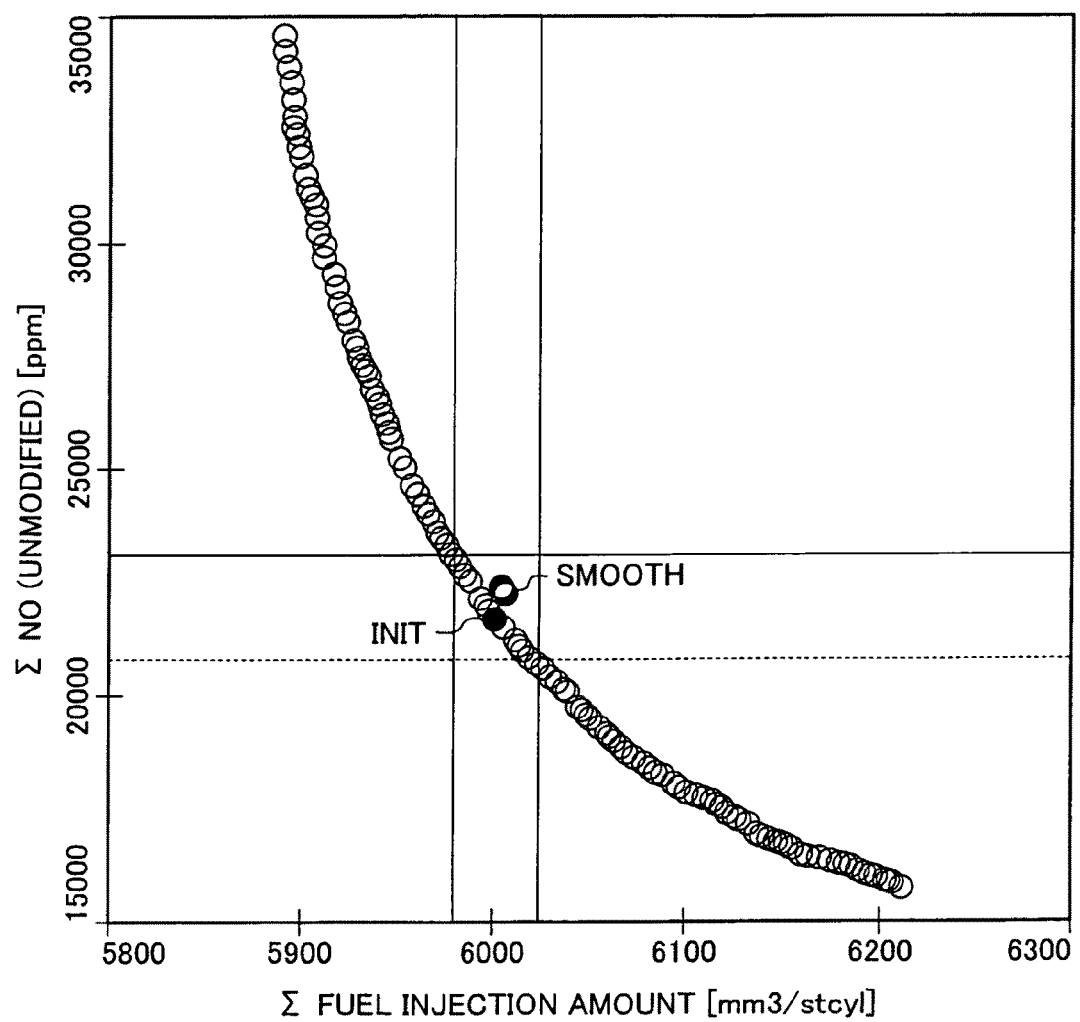
FIG. 27 shows a display screen of global optimal solutions that result in the smoothest change in objective variables when changing the global optimal solutions and the operating states according to one example of the preferred embodiment of the present invention.
Figure 28:
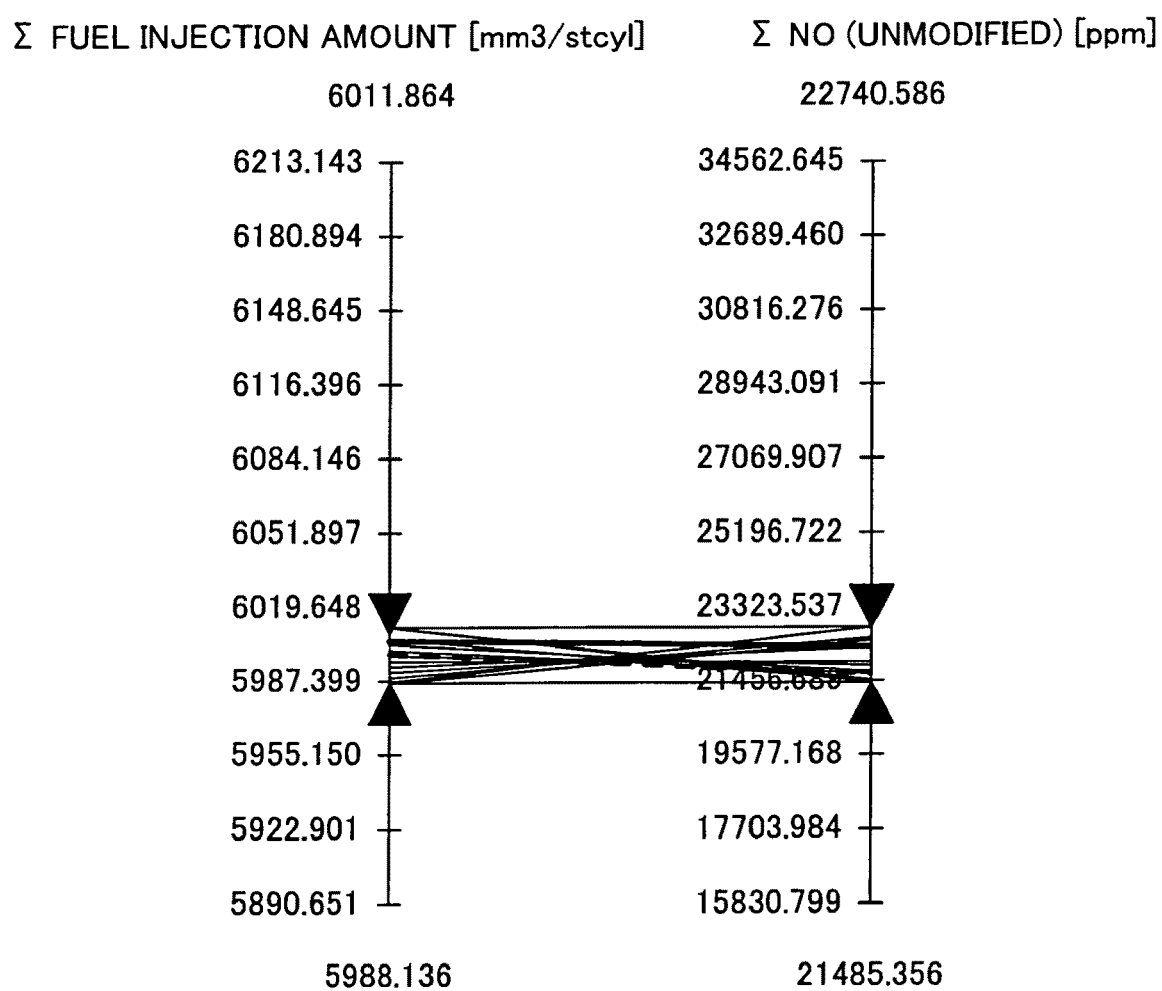
FIG. 28 shows a display screen of global optimal solutions that result in the smoothest change in objective variables when changing the global optimal solutions and the operating states according to one example of the preferred embodiment of the present invention.
Figure 29:
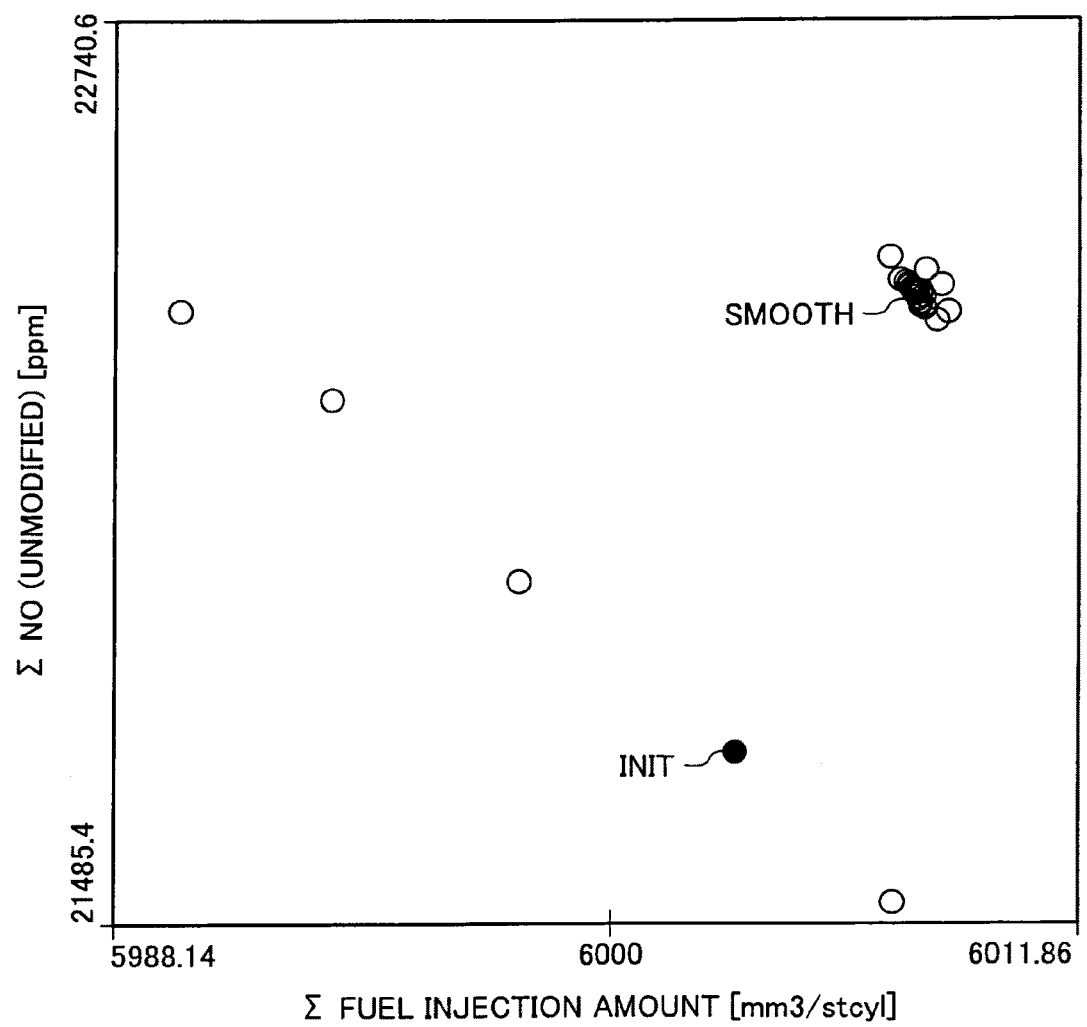
FIG. 29 shows a display screen of global optimal solutions that result in the smoothest change in objective variables when changing the global optimal solutions and the operating states according to one example of the preferred embodiment of the present invention.

FIGS. 25 to 30 respectively show display screens of global optimal solutions that result in the smoothest change in design variables when changing the global optimal solutions and the operating states according to one example of the preferred embodiment of the present invention. As shown in FIG. 25, FIG. 27 and FIG. 29, it is possible to calculate global optimal solutions (SMOOTH) that result in the smoothest change in the design variables when changing the operating states, with one of the global optimal solutions as an initial value set (INIT). The points around SMOOTH are the loci of the combinations of the design variables that have been calculated in the process of solving the combinational problem which minimizes the square-sum of the remainder of fitting to the quadratic surface in a range that does not exceed the designated upper limit.

Figure 30:
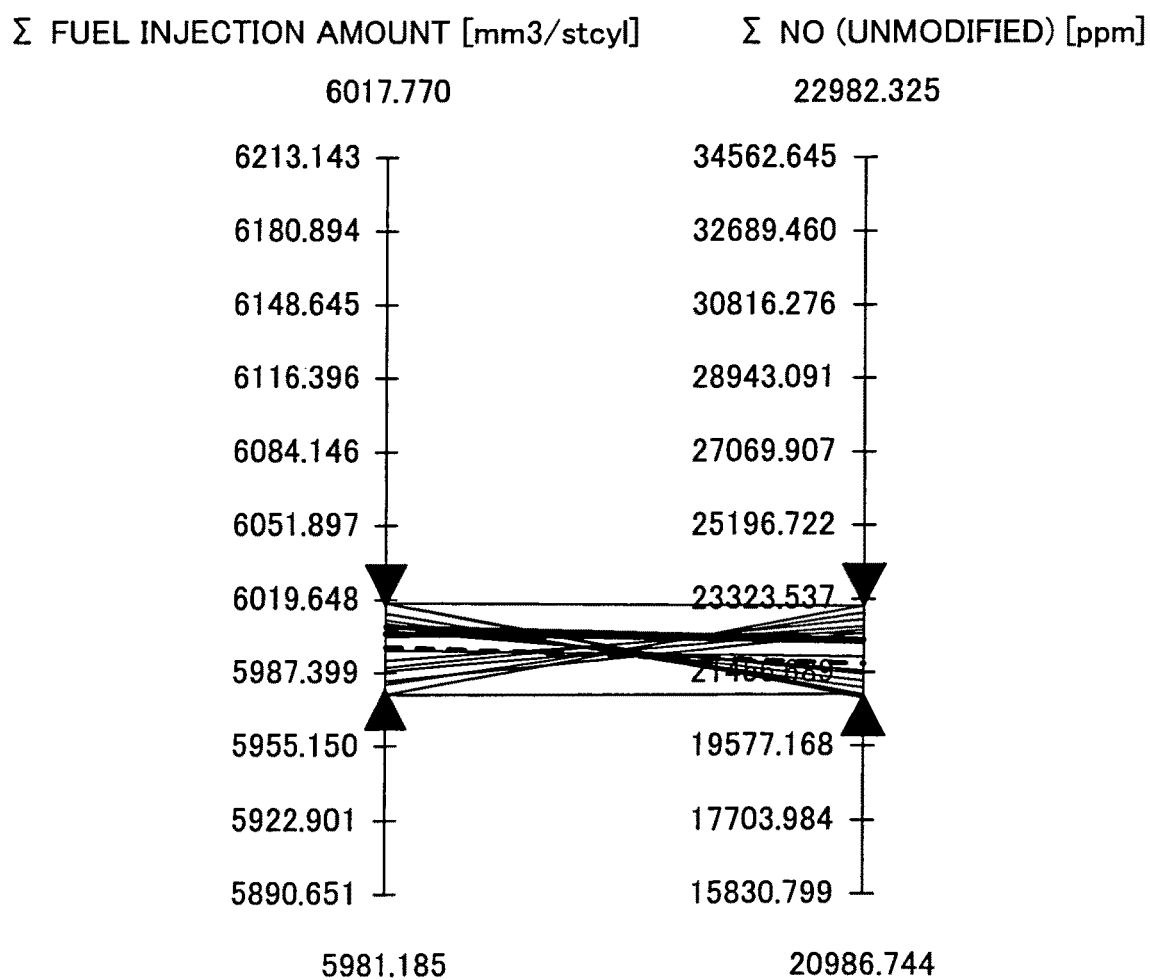
FIG. 30 shows a display screen of global optimal solutions that result in the smoothest change in objective variables when changing the global optimal solutions and the operating states according to one example of the preferred embodiment of the present invention.
Figure 31A:
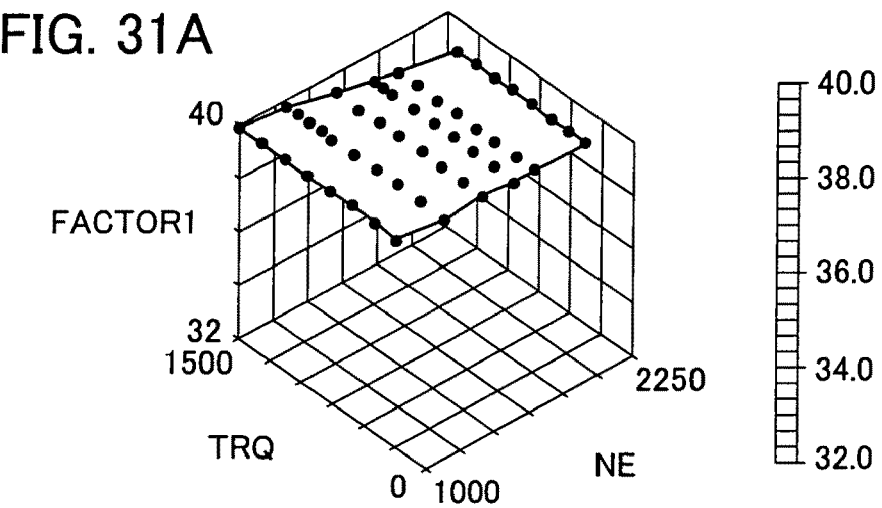
FIGS. 31A to 31C respectively show maps after optimization according to one example of the preferred embodiment of the present invention.
Figure 31B:
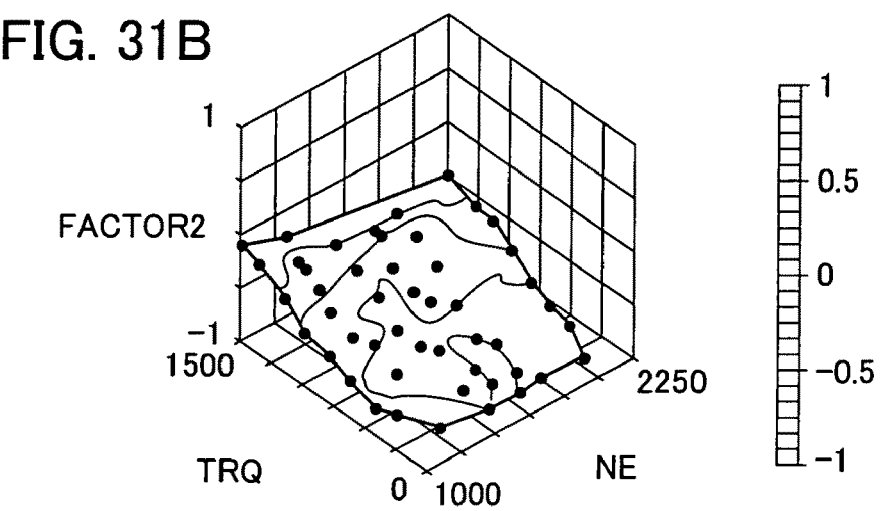
Figure 31C:
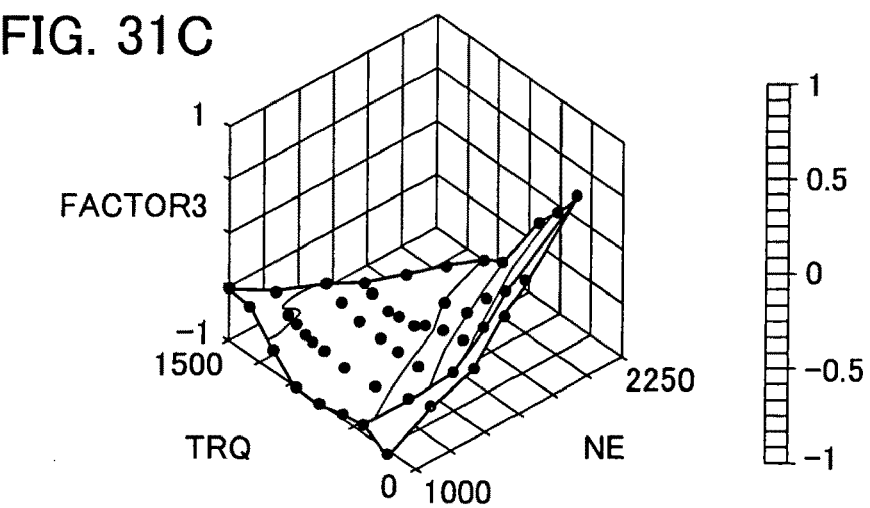
Figure 32A:
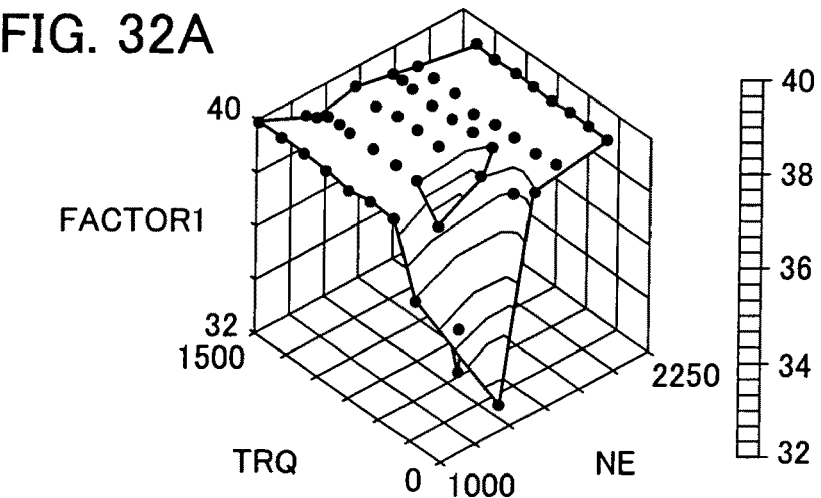
FIGS. 32A to 32C respectively show maps before optimization according to one example of the preferred embodiment of the present invention.
Figure 32B:
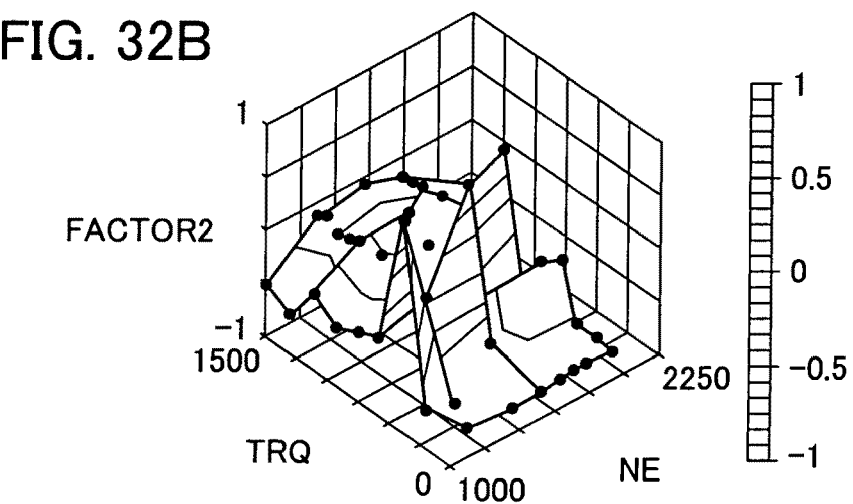
Figure 32C:
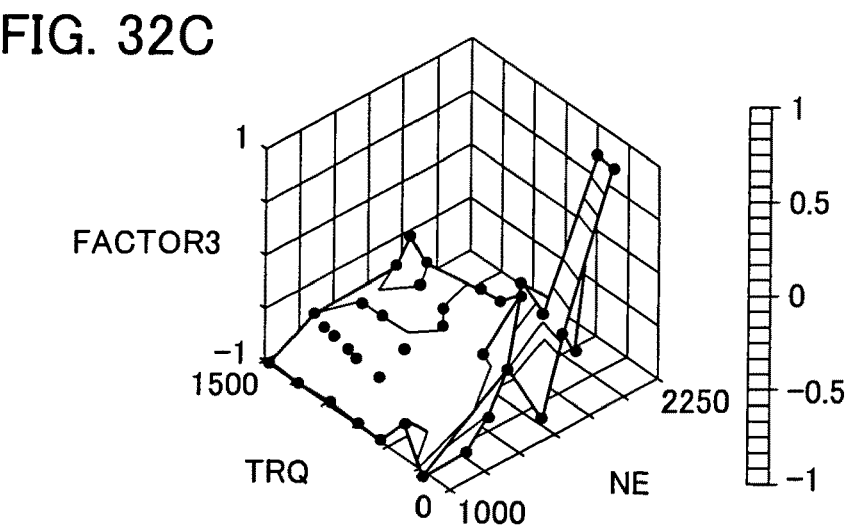

As shown in FIGS. 26, 28 and 30, the user can designate an upper limit of the objective variables or zooming of the display screen by sliding upper and lower triangular icons that are displayed on the screen. In this case, the user can designate upper limits of the objective variables or zooming of the display screens as shown in FIGS. 26, 28 and 30, while viewing the global optimal solutions by means of the display screens shown in FIGS. 25, 28 and 29.

FIGS. 31A to 31C and FIGS. 32A to 32C illustrate by comparing maps before optimization (FIGS. 32A to 32C) and after optimization (FIGS. 31A to 31C) according to one example of the preferred embodiment of the present invention. It is understood that the changes in FACTOR1 to FACTOR3, which are design variables, in relation to the changes in the operating states are smoother after optimizing the maps than before optimizing the maps.

[Calculation of Square-Sum of Remainder of Fitting to Quadratic Surface]

Here, the calculation of the square-sum of the remainder of fitting to the quadratic surface, which is used in the present invention, is explained. It should be noted that, as described above, in the present invention, a technique for searching for global optimal solutions that result in the smoothest change in the design variables when changing the operating states is not limited to this, and the other known techniques may be used.

Initially, a value of a factor (in the case of three factors) for (i) each operating state (mode) is as follows.

$$x_1^i, x_2^i, x_3^i$$

A regression formula for (j) each objective function and for (i) each mode:

$$f_1^i(x_1^i, x_2^i, x_3^i)$$

$$f_2^i(x_1^i, x_2^i, x_3^i)$$

$$\cdots$$

$$f_j^i(x_1^i, x_2^i, x_3^i)$$

A regression formula for (k) each constraint function and for (i) each mode:

$$g_1^i(x_1^i, x_2^i, x_3^i)$$

$$g_2^i(x_1^i, x_2^i, x_3^i)$$

$$\cdots$$

$$g_k^i(x_1^i, x_2^i, x_3^i)$$

Weight of the objective function (for each mode):

$$w^i$$

Constraint

Upper and lower limits of factors for each mode:

$$XUP_1^i, XUP_2^i, XUP_3^i, XDW_1^i, XDW_2^i, XDW_3^i$$

Local upper and lower limits for each mode of the constraint function:

$FUP_k^i, FDW_k^i$

Upper and lower limits of weighted summation of the objective function:

$GUP_j, GDW_j$

Upper and lower limits of weighted summation of the constraint function:

$LUP_k, LDW_k$

Optimization Model
Variables $x_1^i, x_2^i, x_3^i$

Constraint Equation $$XDW_1^i \leq x_1^i \leq XUP_1^i$$

...

$$FDW_j^i \leq f_j^i \leq FUP_j^i$$

$$GDW_j \leq \sum_i (W_i \cdot f_j^i) \leq GUP_j$$

$$LDW_k \leq \sum_i (W_i \cdot g_k^i) \leq LUP_k$$

Revolution Speed of Each Mode $Ne^i$

Torque of Each Mode $Trk^i$

Multipurpose minimalization, and the remainder of response surface for each factor A revolution speed for each mode and a two-dimension response surface of the objective function in two dimensions of the torque are obtained, and the remainder sum thereof is used as an index.

A multipurpose Pareto solution that minimizes the factor differentiation index is obtained.

6 coefficients are obtained from $x_1^i, Ne^i, Trk^i$ for the response quadratic surface and the number of modes.

$x_1^i = a + b*Ne^i + c*Trk^i + d*Ne^i*Ne^i + e*Trk^i*Trk^i + f*Ne^i*Trk^i$

Remainder sum $$\sum_i \left( x_1^i - \left( \begin{array}{c} a + b*Ne^i + c*Trk^i + d*Ne^i*Ne^i + \\ e*Trk^i*Trk^i + f*Ne^i*Trk^i \end{array} \right) \right)^2$$

Although an embodiment of the present invention has been described as above, the present invention is not limited to the aforementioned embodiment. In addition, the effects described in the embodiment of the present invention only represent the most preferred effects generated from the present invention, and the effects according to the present invention are not limited to those described in the embodiment of the present invention.

What is claimed is:

1. A method for calculating, by use of a computer, design variables for a plurality of combinations of a plurality of operating states included in an operating range of an engine and for a plurality of combinations of a plurality of objective variables, the method comprising the steps of:
   obtaining global optimal solutions of the design variables that minimize or maximize a sum of the plurality of objective variables which respectively correspond to the plurality of combinations of the plurality of operating states;
   receiving designation of an upper limit or a lower limit of the plurality of objective variables; and
   searching for global optimal solutions that result in the smoothest change in the design variables when changing the operating states in a range of the received upper limit to the received lower limit of the objective variables, with one of the global optimal solutions as an initial value set.

2. The method according to claim 1, wherein
   in the step of searching, the computer searches for the global optimal solutions such that a square-sum of a remainder of fitting to a curve surface function is minimized, regarding changes in the design variables in relation to the operating states.

3. The method according to claim 1, wherein
   in the step of searching, the computer searches for the global optimal solutions such that a square-sum of a remainder of fitting to a quadratic surface is minimized, regarding changes in the design variables in relation to the operating states.

4. The method according to claim 1, further comprising:
   a step of displaying, by the computer, changes in the design variables in relation to the operating states, regarding the searched global optimal solutions.

5. The method according to claim 1, further comprising:
   a step of displaying, by the computer, the global optimal solutions as a graph of changes in the design variables in relation to changes in the operating states; and
   a step of receiving an operation for designating an upper limit or a lower limit of the objective variables, while presenting the displayed graph.

6. The method according to claim 1, wherein a program which allows execution of processing of each of the steps is used.

7. The method according to claim 1, wherein
   the operating states include at least revolution speed of the engine and load on the engine.

8. The method according to claim 1, wherein
   the objective variables include at least specific fuel consumption of the engine and nitrogen oxide emission concentration.

9. The method according to claim 8, wherein the computer is at least one computer included in a network computer system.

10. A computer for calculating design variables for a plurality of combinations of a plurality of operating states included in an operating range of an engine and for a plurality of combinations of a plurality of objective variables, the computer comprising:
    a calculating device for obtaining global optimal solutions of the design variables that minimize or maximize a sum of the plurality of objective variables which respectively correspond to the plurality of combinations of the plurality of operating states;
    a receiving device for receiving designation of an upper limit or a lower limit of the plurality of objective variables; and a searching device for searching for global optimal solutions that result in the smoothest change in the design variables when changing the operating states in a range of the received upper limit to the received lower limit of the objective variables, with one of the global optimal solutions as an initial value set.

11. A recording medium storing a program for causing a computer to calculate design variables for a plurality of combinations of a plurality of operating states included in an operating range of an engine and for a plurality of combinations of a plurality of objective variables, the recording medium storing the program causing execution of the steps of:

obtaining global optimal solutions of the design variables that minimize or maximize a sum of the plurality of objective variables, which respectively correspond to the plurality of combinations of the plurality of operating states;

receiving a designation of an upper limit or a lower limit of the plurality of objective variables; and searching for global optimal solutions that result in the smoothest change in the design variables when changing the operating states in a range of the received upper limit to the received lower limit of the objective variables, with one of the global optimal solutions as an initial value set.

* * * * *